(12) United States Patent
Hirsch et al.

(10) Patent No.: US 12,507,696 B2
(45) Date of Patent: Dec. 30, 2025

(54) BACTERIA ISOLATED FROM LEGUME ROOT NODULES GROWN IN ARID, EGYPTIAN SOILS PROMOTE WHEAT GROWTH

(71) Applicants: THE REGENTS OF THE UNIVERSITY OF CALIFORNIA, Oakland, CA (US); AGRICULTURAL RESEARCH CENTER, Giza (EG)

(72) Inventors: Ann M. Hirsch, Santa Monica (CA); Sameh H. Youseif, Zagazig (EG); Fayrouz H. Abd El-Megeed, Giza (EG)

(73) Assignees: THE REGENTS OF THE UNIVERSITY OF CALIFORNIA, Oakland, CA (US); AGRICULTURAL RESEARCH CENTER, Giza (EG)

( * ) Notice: Subject to any disclaimer, the term of this patent is extended or adjusted under 35 U.S.C. 154(b) by 0 days.

(21) Appl. No.: 17/970,470

(22) Filed: Oct. 20, 2022

(65) Prior Publication Data

US 2023/0124894 A1    Apr. 20, 2023

Related U.S. Application Data

(60) Provisional application No. 63/257,975, filed on Oct. 20, 2021.

(51) Int. Cl.
*A01N 63/20* (2020.01)
(52) U.S. Cl.
CPC .................................. *A01N 63/20* (2020.01)
(58) Field of Classification Search
None
See application file for complete search history.

(56) References Cited

PUBLICATIONS

Das N, et al., Progress in the development of gelling agents for improved culturability of microorganisms. *Front Microbial* 6:698, Jul. 23, 2015.
Kato S, et al., Isolation of previously uncultured slow-growing bacteria by using a simple modification in the preparation of agar media. *Appl Environ Microbial* 84(19), Oct. 2018.
Martinez-Hidalgo P et al., Engineering root microbiomes for healthier crops and soils using beneficial, environmentally safe bacteria. *Can J Microbial*, 65:91-104, Sep. 18, 2019.
Nyonyo T et al., Effect of media composition, including gelling agents, on isolation of previously uncultured rumen bacteria. *Lett Appl Microbial*, 56:63-70, 2012.
Rilling JI et al., Putative nitrogen-fixing bacteria associated with the rhizosphere and root endosphere of wheat plants grown in an andisol from southern Chile. *Front Microbial* 9:2710, Nov. 2018.
Rygaard AM et al., Effects of gelling agent and extracellular signaling molecules on the culturability of marine bacteria. *ApplEnviron Microbial* 83(9), May 2017.
Tamaki H et al., Effect of gelling agent on colony formation in solid cultivation of microbial community in lake sediment. *Environ Microbial* 11(7): 1827-1834, Mar. 18, 2009.

*Primary Examiner* — Alton N Pryor
(74) *Attorney, Agent, or Firm* — Norton Rose Fulbright US LLP

(57) ABSTRACT

Methods and compositions for increasing one or more plant growth characteristics in a plant are disclosed. The compositions comprise one or more microbial isolates that promote plant growth. Methods include providing an effective amount of a composition comprising one or more microbial isolates that promote one or more plant growth characteristics. Aspects of the disclosure are directed to microbial isolates obtained from root nodules of *T. aestivum*.

15 Claims, 10 Drawing Sheets

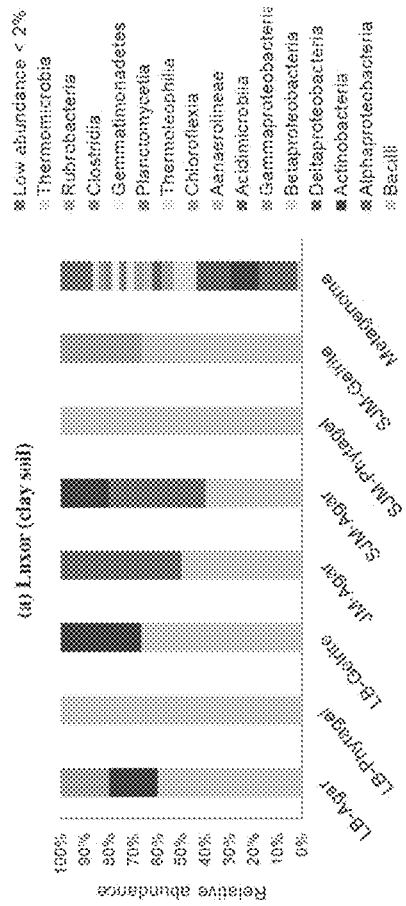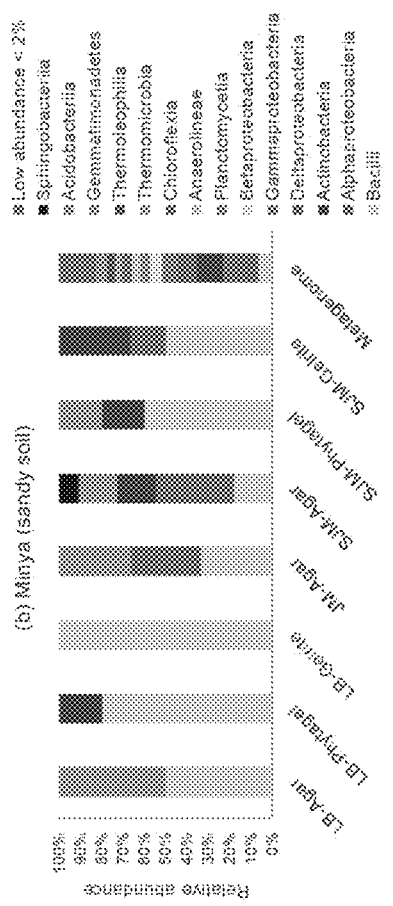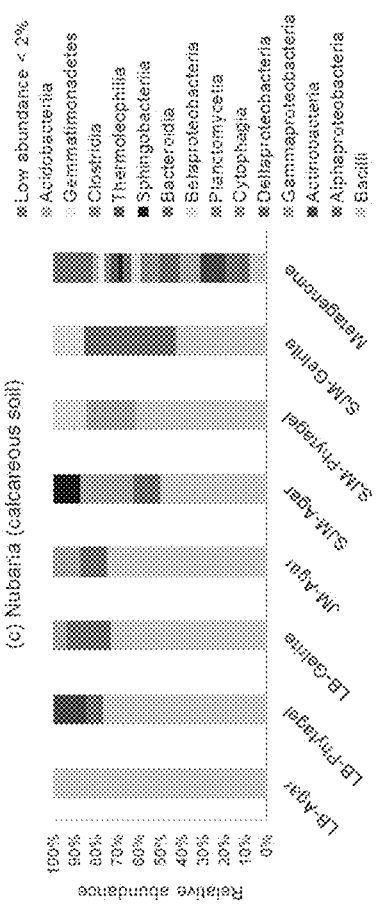
FIG. 7A
FIG. 7B
FIG. 7C

BACTERIA ISOLATED FROM LEGUME ROOT NODULES GROWN IN ARID, EGYPTIAN SOILS PROMOTE WHEAT GROWTH

This application claims priority of U.S. Provisional Patent Application No. 63/257,975 filed Oct. 20, 2021, which is hereby incorporated by reference in its entirety.

SUMMARY

The present disclosure provides novel microbial isolates, combinations of such isolates, compositions containing such isolates, and methods of using such isolates for increasing plant growth characteristics in plants.

In some embodiments disclosed herein, there is disclosed a method of increasing one or more plant growth characteristics in a plant, the method comprising providing to the plant an effective amount of one or more of the following plant growth-promoting microbial isolates: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. The genus designation is based on comparison of 16S rRNA sequences to known microbial species, as described further in the Examples below, and is not meant to be limiting. A microbial isolate of the present disclosure may have 100% identity to a known microbial species based on comparison of 16S rRNA sequences while still being a distinct microbial species with unique properties and characteristics. Such distinction may be determined based on, for example, analysis of other, non-16S rRNA nucleic acid sequences from the genome of the microbial isolate.

The microbial isolates disclosed herein have all the identifying characteristics of deposited microorganisms having the same strain designation as those used herein and/or having the indicated accession numbers. Any number of these microbial isolates can be used in the methods described herein, including one or more, two or more, three or more, four or more, five or more, six or more, seven or more, eight or more, nine or more, 10 or more, 15 or more of the plant growth-promoting microbial isolates, or any range or value derivable therein. In some embodiments, the one or more plant growth-promoting microbial isolates comprise *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. In some embodiments, the one or more plant growth-promoting microbial isolates comprise *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10.

In some embodiments, the one or more plant growth-promoting microbial isolates of the present disclosure have one or more of the following abilities: nitrogen fixation, siderophore production, iron chelation, phosphate solubilization, chitinase production, cellulase production, pectinase production, xylanase production, growth at pH 4.5, growth at pH 4, growth at pH 5.5, growth at pH 7, growth at pH 9, and growth in 5% NaCl.

The microbial isolates disclosed herein may promote plant growth in a number of ways. In some embodiments, a method of promoting one or more plant growth characteristics comprises promoting one or more of the following characteristics: plant biomass, plant growth rate, plant yield, shoot length, shoot biomass, fresh cob weight, dry cob weight, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and growth under high temperature soil conditions. Other plant growth characteristics may also be promoted using the microbial isolates disclosed herein.

In some embodiments of methods of promoting one or more plant growth characteristics, the microbial isolates disclosed herein may be provided in combination with other microbes. In some embodiments, the plant is provided an effective amount of one or more rhizobial bacterial strains in addition to the strains described above. In some embodiments, the one or more rhizobial bacterial strains comprises *Ensifer meliloti* 1021. In some embodiments, a combination of strains exhibits an additive or synergistic effect in promoting a plant growth characteristic. When provided in combination with another strain, the microbial isolates disclosed herein may be provided together with the additional strains. This may be achieved by mixing the strains in a single composition or by providing the strains in separate compositions at approximately the same time. Providing the strains in combination may also entail providing one or more of the strains described above before or after another strain, but in close enough succession that the strains can exert a combined effect on one or more plant growth promoting characteristics.

Providing a plant with one or more plant growth-promoting microbial isolates can be accomplished in a variety of ways known to those skilled in the art. In some embodiments, providing to the plant an effective amount of one or more plant growth-promoting microbial isolates comprises contacting seed of the plant with the one or more plant growth-promoting microbial isolates. In some embodiments, providing to the plant an effective amount of one or more plant growth-promoting microbial isolates comprises adding the one or more plant growth-promoting microbial isolates to the soil in which the plant is growing or will grow. In some embodiments, providing to the plant an effective amount of one or more plant growth-promoting microbial isolates comprises contacting the plant or a part thereof with the one or more plant growth-promoting microbial isolates. Contacting the plant may be effective when one or more of various plant parts are contacted with the microbial isolates. In some embodiments, the plant part comprises the plant roots. In some embodiments, the plant part comprises the plant rhizosphere. The rhizosphere may comprise one or more of roots, root nodules, root caps, root exudate, rhizosphere-associate microorganisms, and rhizosphere-associated soil.

The plants whose one or more growth characteristics may be promoted according to methods disclosed herein include many varieties of plants. In some embodiments, the plant is a dicotyledon, a crop plant, and/or a legume. In some embodiments, the plant is a crop plant. In some embodiments, the plant is wheat. In some embodiments, the plant is sorghum. In some embodiments, the plant is a legume. In some embodiments, the plant is cowpea.

Also disclosed herein is a composition comprising one or more microbial isolates selected from the following: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. In some embodiments, the one or more plant growth-promoting microbial isolates comprise *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. In some embodiments, the composition is a plant growth-promoting composition. In some embodiments, the one or more microbial isolates are plant growth-promoting microbial isolates. In some embodiments, the composition comprises an effective amount of the one or more microbial isolates. In some embodiments, the composition comprises one or more, two or more, three or more, four or more, five or more, six or more, seven or more, eight or more, nine or more, 10 or more, 15 or more of the plant growth-promoting microbial isolates, or any range between any two of these values.

In some embodiments, the compositions comprising one or more of the microbial isolates disclosed herein comprise additional substances that affect the properties of the microbial isolate(s) in the composition. Such substances may include mannitol, skim milk, bovine serum albumin (BSA), sucrose, and/or trehalose. Mannitol, skim milk, BSA, plant protein, and other similar agents can be used to give body to a bacterial suspension after freeze drying. Sucrose, trehalose, glycerol, and other lysoprotectants alter the ability of bacteria in the composition to survive freezing, which may be done as part of a freeze drying process. In some embodiments, the composition comprises aqueous solutions comprising 5-10% sucrose, trehalose, or glycerol. In some embodiments, the microbial isolate is comprised in a freeze dried composition.

In some embodiments, the compositions disclosed herein comprise additional substances. In some embodiments, the composition comprises plant seeds. In some embodiments, the composition comprises one or more additional microbial strains, such as a rhizobial bacterial strain. In some embodiments, the rhizobial bacterial strain is *Ensifer meliloti* 1021.

Also disclosed herein are isolated bacteria capable of increasing one or more plant growth characteristics in a plant and comprising bacteria of at least one bacterial strain having all the identifying characteristics of an isolate selected from the following: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. In some embodiments, the one or more plant growth-promoting microbial isolates comprise *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10.

Certain embodiments relate to a plant. The plant may comprise one or more isolates, including one or more of the following plant growth-promoting microbial isolates: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10.

Certain embodiments relate to plant systems. The plant system may comprise a plant and one or more isolates including one or more of the following plant growth-promoting microbial isolates: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. The plant system may comprise a plant contacted with one or more isolates including one or more of the following plant growth-promoting microbial isolates: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10. The plant system may comprise a plant and soil comprising one or more of the following plant growth-promoting microbial isolates: *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10.

In such embodiments, the plant may be any plant described herein. It is contemplated that plants comprising or contacted with the one or more isolates are not found in nature. It is contemplated that plant systems comprising the plant and soil comprising the one or more isolates are not found in nature.

An "effective amount" as used herein refers to the amount of an agent, such as a microbe, or combined amounts of multiple agents that, when applied to or otherwise provided to a plant, a seed, or portion of a plant, is sufficient to enhance a plant growth characteristic of the plant.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

It is specifically contemplated that embodiments described herein may be excluded. It is further contemplated that, when a range is described, certain ranges may be excluded.

As used herein the specification, "a" or "an" may mean one or more. As used herein in the claim(s), when used in conjunction with the word "comprising", the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Throughout this application, the term "about" is used to indicate that a value includes the inherent variation of error for the device, the method being employed to determine the value, or the variation that exists among the study subjects.

Other objects, features and advantages of the present invention will become apparent from the following detailed description. It should be understood, however, that the detailed description and the specific examples, while indicating certain embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

(FIG. 6A) Heat map of PGP traits of bacterial strains isolated from the three soil types (I) clay soil from Luxor, (II) sandy soil from Minya, and (III) calcareous soil from Nubaria. The white cells: no production; light green cells: low production; green cells: medium production; dark green cells: high production. (FIG. 6B) Venn-Diagram showing the isolates that presented each of the possible combinations for the two PGP evaluated traits. Values are presented as the absolute number of isolates and also as percentages (in parentheses).

FIGS. 7A-7C. Comparison of metagenomic (culture-independent) and cultured bacteria datasets at the class level distributed in the three rhizospheric soil samples (FIG. 7A) Luxor, (FIG. 7B) Minya and (FIG. 7C) Nubaria of *T. aestivum* L. plants. JM (Jensen medium prepared by autoclaving phosphate and solidifying agent together), SJM (Jensen medium prepared by autoclaving phosphates and solidifying agent separately).

DESCRIPTION OF ILLUSTRATIVE EMBODIMENTS

Figure 1:
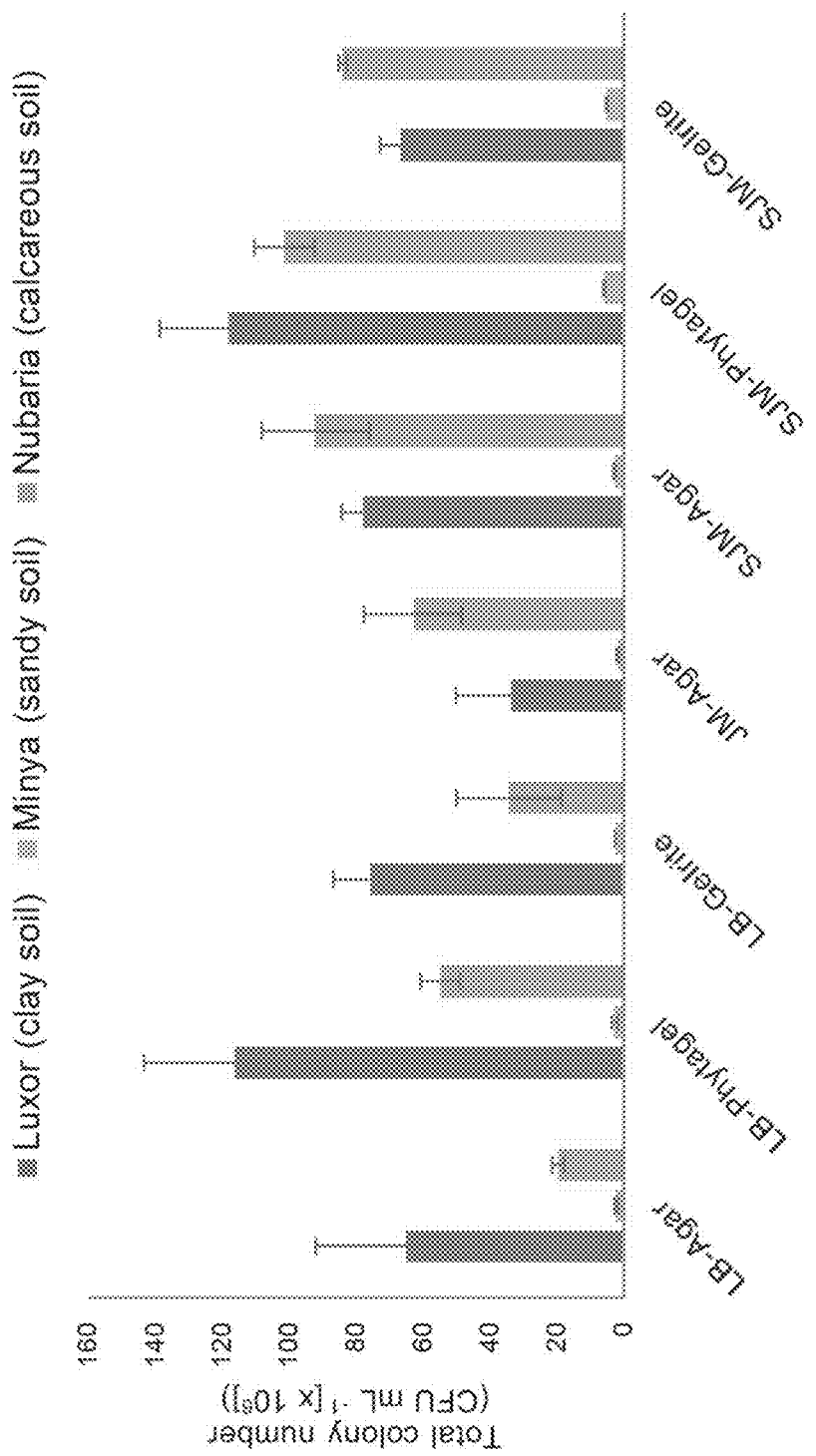
FIG. 1. Effect of isolation media and gelling agents on the total colony number of bacteria recovered from the wheat rhizosphere microbiome.

Disclosed herein are plant growth promoting microbial isolates, including those that have been isolated from wheat root nodules, as well as compositions including such isolates and methods of using such isolates. These and other aspects of the disclosure are described in more detail below.

The present disclosure provides methods and compositions for use in increasing one or more plant growth characteristics by providing the plant with or growing the plant in the presence of one or more plant growth-promoting microbial isolates of the present disclosure. As used herein, "plant growth-promoting microbial isolate(s)," "PGPM isolate(s)," and "plant growth-promoting microorganism(s)" refer to isolated microbial strains, such as prokaryotes (e.g., bacteria, also "plant growth-promoting bacteria" or "PGPB"), fungi, yeast, and the like, that are beneficial to plants. For example, such "PGPM isolate(s)" may exhibit characteristics including, without limitation, nitrogen fixation, siderophore production, iron chelation, phosphate solubilization, chitinase production, and cellulase production, that promote plant growth by increasing one or more plant growth characteristics. As used herein "plant growth characteristic(s)" refers to any plant trait associated, for example, with plant growth, development, hardiness, and yield.

I. PLANT GROWTH-PROMOTING MICROBIAL ISOLATES

Certain aspects of the present disclosure are related to compositions including one or more isolated plant growth-promoting microorganisms (e.g., microbial isolates) and methods of using such compositions for increasing one or more plant growth characteristics in plants. Any growth-promoting microorganisms may be used to increase plant growth characteristics in plants. Advantageously, microbial isolates of the present disclosure have one or more plant growth-promoting (PGP) activities that allow plants to grow in harsh environments, such as high salt environments, high or low pH environments, low moisture environments, deserts, arid environments, nitrogen-poor environments, nutrient-poor environments, low temperature environments, and high temperature environments. For example, microbial isolates of the present disclosure may exhibit characteristics including, without limitation, nitrogen fixation, siderophore production, iron chelation, phosphate solubilization, chitinase production, and cellulase production, that promote plant growth in plants grown under harsh environments or in favorable environments. PGPM isolates of the present disclosure include, without limitation, bacteria, such as actinomycetes, firmicutes, and proteobacteria; archaea; fungi; and yeast.

Suitable PGPM isolates of the present disclosure include, without limitation, any PGPMs isolated from the plant tissue, seeds, roots, rhizosphere, plant-associated soil samples, and/or surrounding soil samples from indigenous plants that grow in harsh environmental conditions, such as deserts, arid environments, nitrogen-poor environments, nutrient-poor environments, low pH environments, high pH environments, low temperature environments, and high temperature environments, or from plants that grow in favorable environments. Accordingly, in some embodiments, PGPM isolates of the present disclosure exhibit one or more characteristics that include, without limitation, nitrogen fixation, siderophore production, iron chelation, phosphate solubilization, chitinase production, and cellulase production.

In certain embodiments, plant growth-promoting microbial (PGPM) isolates of the present disclosure include, without limitation, any PGPM isolated from the plant tissue, seeds, roots, rhizosphere, plant-associated soil samples, and/or surrounding soil samples from *Vigna* plants, including *T. aestivum*. In some embodiments, the PGPM are isolated using bacterial culture-dependent methods, including trap experiments.

Examples of suitable PGPM isolates of the present disclosure include, without limitation, those listed in Table 1.

TABLE 1

| Strain Designation | GenBank Accession No. |
|---|---|
| *Variovorax boronicumulans* EBFNA2 | GCA_033802765.1 |

Accordingly, in certain embodiments, the PGPM isolate is an isolated strain having all the identifying characteristics of a bacterium having the sequence of GenBank assembly accession number GCA 033802765.1.

In some embodiments, PGPM isolates of the present disclosure also include homologues, variants, and mutants of the PGPM isolates listed in Table 1. Preferably, the homologues, variants, and mutants of the PGPM isolates listed in Table 1 have all the identifying characteristics of the PGPM isolates listed in Table 1.

In some embodiments, a PGPM of the present disclosure, although being a unique, novel microbial isolate, has 100% 16S rRNA sequence identity with a previously described microbial species. A PGPM of the present disclosure may have 95%, 96%, 97%, 98%, 99%, 99.1%, 99.2%, 99.3%, 99.4%, 99.5%, 99.6%, 99.7%, 99.8%, 99.9%, or 100% 16S rRNA identity with a known or previously described microbial species, or any range or value derivable therein. As such, one or more additional characteristics may be used to distinctly identify a PGPM of the present disclosure from known microbial species. For example, a non-16S rRNA nucleic acid sequence may be compared. In some embodiments, a PGPM of the present disclosure has less than 100% sequence identity with any known or previously described microbial species at at least one nucleic acid region.

In some embodiments, a plant growth-promoting bacteria of the disclosure comprises one or more bacteria of Table 2.

TABLE 2

| Egyptian strains of bacteria isolated from *Vicia faba* nodules and tested for plant growth-promoting traits | |
|---|---|
| Strain | Traits |
| *Variovorax boronicumulans* EBFNA2 | Produces siderophores (CAS+) and ACC deaminase, solubilizes rock phosphate (PVK+), good growth on a range of heavy metals, does not degrade acrylamide |
| *Fictibacillus phosphorivorans* EBFTY2 | CAS+, produces amylase for breaking down starch, grows on 6% NaCl and 1.37 Osm sucrose |
| *Bacillus ginsengihumi* EBFTY3 | CAS+, PVK+, grows on 0.69 Osm sucrose |
| *Rhizobium leguminosarum* EBFTY4 | CAS+, PVK+, produces cellulase (CMC+), effectively nodulates fava bean (*V. faba*) |
| *Agrobacterium deltaense* EBF6ACT1 | CAS+, PVK+, CMC+, grows on 2% NaCl and 0.69 Osm sucrose |
| *Methylobacterium oryzae* EBF6NA2 | CAS+, grows on 2% NaCl |
| *Rhizobium sophorae* EBF6NA4 | CAS+, PVK+, CMC+, effectively nodulates fava bean |
| *Bacillus safensis* subsp. *safensis* EBF6TY3 | CAS+, PVK+, CMC+, growth on 6% NaCl and 1.37 Osm sucrose |
| *Paenibacillus* sp. DMB5 Fava 2 | Produces amylase, CMC+ |
| *Bacillus licheniformis* Fava 6 | CAS+, PVK+, amylase+, CMC+, grows on 6% NaCl and 1.37 Osm sucrose |
| *Bacillus tequilensis* Fava 10 | CAS+, PVK+, amylase+, CMC+, grows on 6% NaCl and 1.37 Osm sucrose |

II. MICROBIAL CONSORTIA

In some embodiments, the plant growth-promoting compositions of the present disclosure include consortia of PGPM isolates having a mixture of two or more PGPM isolates of the present disclosure. A microbial consortium of the present disclosure may be isolated from an environmental sample such as a plant, rhizosphere, or soil sample from a *T. aestivum* plant. In addition, a microbial consortium of the present disclosure may be rationally designed by combining microbial strains, such as the PGPM isolates of the present disclosure. Moreover, microbial consortia of the present disclosure may further include one or more rhizobial bacterial strains in addition to any of the microbial strains disclosed herein. Any suitable rhizobial strain known in the art may be used.

Accordingly, in certain embodiments, a plant of the present disclosure is grown in the presence of a microbial consortium containing from two or more to 15 or more PGPM isolates of the present disclosure. In some embodiments, a plant of the present disclosure is grown in the presence of a microbial consortium containing two or more, three or more, four or more, five or more, six or more, seven or more, eight or more, nine or more, 10 or more, or 15 or more of the PGPM isolates of the present disclosure.

III. PLANT GROWTH-PROMOTING COMPOSITIONS

Other aspects of the present disclosure relate to plant growth-promoting (PGP) compositions containing one or more PGPM isolates of the present disclosure for increasing one or more plant growth characteristics in plants.

In some embodiments, the PGP composition may include from one or more to 15 or more PGPM isolates of the present disclosure. In other embodiments, the PGP composition includes one or more, two or more, three or more, four or more, five or more, six or more, seven or more, eight or more, nine or more, 10 or more, or 15 or more of the PGPM isolates of the present disclosure.

In certain embodiments, the PGP composition may also include one or more rhizobial bacterial strains in addition to the PGPM isolates of the present disclosure. Any suitable rhizobial strain known in the art may be used, including *Ensifer meliloti* 1021.

In order to achieve an increase in one or more plant growth characteristics, the PGP compositions of the present disclosure may also include other components or mixture of components to facilitate the viability of the PGPM isolates; inoculation of the plant, plant parts thereof, or rhizospheres; or transportation or storage of the compositions. Any suitable components known in the art may be used.

In some embodiments, the PGP compositions of the present disclosure may further contain a carrier for delivering, inoculating, or otherwise growing a plant in the presence of the composition in order to promote plant growth and productivity, such as germination, yield, and the like, by increasing one or more plant growth characteristics. Any suitable carrier known in the art may be used, including without limitation, a liquid, a solid, and a combination of a liquid and a solid carrier. In some embodiments, the liquid carrier may include water.

PGP compositions of the present disclosure may further contain components for providing additional benefits to the PGPM isolates or plants, including without limitation, an herbicide, a pesticide, a fungicide, a plant growth regulator, and an encapsulation agent, a wetting agent, a dispersing agent, and the like for enhancing the effect of the PGP composition.

IV. PLANTS

Other aspects of the present disclosure relate to growing plants in the presence of one or more PGPM isolates of the present disclosure in order to increase one or more plant growth characteristics in the plant.

Plants of the present disclosure may be of any kind or from any source known in the art. For example, suitable plants of the present disclosure include, without limitation, those intended to be grown in harsh environments, such as plants grown in soils that are dry, acidic, or both; plants that are prone to infection by pathogens, such as fungi; plants grown in a desert or arid environment; plants grown in nitrogen-poor environments; plants grown in nutrient-poor environments; plants grown in low pH conditions; plants grown in high pH conditions; plants grown in low temperature conditions; and plants grown in high temperature conditions. Suitable plants of the present disclosure may be native to such harsh environments, or may plants grown in harsh environments but that are not native to such harsh environments. Suitable plants used with the compositions and methods of the present disclosure may be grown in any environment or in any growth medium, such as solid medium or liquid medium. Suitable plants of the present disclosure may also include plants that are grown in favorable conditions.

Suitable plants of the present disclosure include, without limitation, crop plants, energy crop plants, plants that are used in agriculture, and plants used in industrial settings. Plants of the present disclosure may be either monocotyledons or dicotyledons. For example, suitable plants of the present disclosure include, without limitation, desert plants, desert perennials, legumes, such as *Medicago sativa*, (alfalfa), *Lotus japonicus, Mehlotus alba* (sweet clover), *Pisum sativum* (pea), and *Vigna unguiculata* (cowpea), *Mimosa pudica, Lupinus succulentus* (lupine), *Macroptilium atropurpureum* (siratro), *Medicago truncatula*, and *Trifolium repens* (white clover), *Vicia faba*, corn, sorghum, miscanthus, sugarcane, poplar, spruce, pine, *Triticum aestivum* (wheat), rice, soy, cotton, barley, turf grass, tobacco, potato, bamboo, rape, sugar beet, sunflower, willow, *eucalyptus, Amorphophallus* spp., *Amorphophallus konjac*, giant reed (*Arundo donax*), reed canarygrass (*Phalaris arundinacea*), *Miscanthus giganteus, Miscanthus* sp., *sericea lespedeza* (*Lespedeza cuneata*), millet, ryegrass (*Lolium multiflorum, Lolium* sp.), timothy, *Kochia* (*Kochia scoparia*), forage soybeans, clover, sunn hemp, kenaf, bahiagrass, bermudagrass, dallisgrass, pangolagrass, big bluestem, indiangrass, fescue (*Festuca* sp.), *Dactylis* sp., Brachypodium distachyon, smooth bromegrass, orchardgrass, and Kentucky bluegrass. In some aspects, a plant of the present disclosure is a wheat plant.

In certain embodiments, the plants are dicotyledons. It will be apparent to one of skill in the art that the plants of the present disclosure may also include nodulating plants. In other embodiments, the plants are desert plants, desert perennials, crop plants, or legumes. In certain embodiments, the plant are legumes, including without limitation, *Medicago sativa*, (alfalfa), *Lotus japonicus, Mehlotus alba* (sweet clover), *Pisum sativum* (pea), and *Vigna unguiculata* (cowpea), *Mimosa pudica, Lupinus succulentus* (lupine),

*Macroptilium atropurpureum* (siratro), *Medicago truncatula* and *Trifolium repens* (white clover).

V. PLANT GROWTH CHARACTERISTICS

In some embodiments, PGPM isolates of the present disclosure increase one or more plant growth characteristics of plants of the present disclosure. Plant growth characteristics of the present disclosure include, without limitation, plant biomass, plant growth rate, plant yield, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and growth under high temperature soil conditions. As will be apparent to one of skill in the art, certain characteristics, for example nodulation, include other forms of life that interact with the plant.

As used herein, "increasing one or more plant growth characteristics" refers to increasing, without limitation, plant biomass, plant growth rate, plant yield, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and growth under high temperature soil conditions of a plant grown in the presence of one or more PGPM isolates of the present disclosure, as compared to a corresponding plant grown under the same conditions but in the absence of the one or more PGPM isolates of the present disclosure.

In certain embodiments, growing a plant in the presence of one or more PGPM isolates of the present disclosure increases, without limitation, plant biomass, plant growth rate, plant yield, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and/or growth under high temperature soil conditions by about 5% to about 200%, or any range or value derivable therein, as compared to a corresponding plant grown under the same conditions but in the absence of the one or more PGPM isolates of the present disclosure. In some embodiments, growing a plant in the presence of one or more PGPM isolates of the present disclosure increases, without limitation, plant biomass, plant growth rate, plant yield, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and/or growth under high temperature soil conditions by about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 100%, about 110%, about 120%, about 130%, about 140%, about 150%, about 160%, about 170%, about 180%, about 190%, or about 200%, or by a range between any two of these values, as compared to a corresponding plant grown under the same conditions but in the absence of the one or more PGPM isolates of the present disclosure.

In other embodiments, growing a plant in the presence of one or more PGPM isolates of the present disclosure increases, without limitation, plant biomass, plant growth rate, plant yield, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and/or growth under high temperature soil conditions by about 2-fold to about 100-fold, or any range or value derivable therein, as compared to a corresponding plant grown under the same conditions but in the absence of the one or more PGPM isolates of the present disclosure. In some embodiments, growing a plant in the presence of one or more PGPM isolates of the present disclosure increases, without limitation, plant biomass, plant growth rate, plant yield, root biomass, nodulation, nitrogen utilization, nutrient utilization, salt tolerance, resistance to one or more pathogens, resistance to fungal growth, growth under arid conditions, growth under arid soil conditions, growth under low pH conditions, growth under low pH soil conditions, growth under high pH conditions, growth under high pH soil conditions, growth under low temperature conditions, growth under low temperature soil conditions, growth under high temperature conditions, and/or growth under high temperature soil conditions by about 2-fold, about 2.5-fold, about 3-fold, about 3.5-fold, about 4-fold, about 4.5-fold, about 5-fold, about 5.5-fold, about 6-fold, about 6.5-fold, about 7-fold, about 7.5-fold, about 8-fold, about 8.5-fold, about 9-fold, about 9.5-fold, about 10-fold, about 15-fold, about 20-fold, about 25-fold, about 30-fold, about 35-fold, about 40-fold, about 45-fold, about 50-fold, about 55-fold, about 60-fold, about 65-fold, about 70-fold, about 75-fold, about 80-fold, about 85-fold, about 90-fold, about 95-fold, or about 100-fold, or by an amount between any two of these values, as compared to a corresponding plant grown under the same conditions but in the absence of the one or more PGPM isolates of the present disclosure.

As disclosed herein, plant biomass and yield refer to the accumulation of plant matter in any part or all of the plant, with yield including, without limitation, the crop production of crop plants.

As disclosed herein, nodulation includes any process or quality associated with root nodule formation, including but not limited to nodule size, color, clustering, development, branching of vascular bundles, and colonization by rhizobia.

As disclosed herein, nitrogen and nutrient utilization include, without limitation, how well nitrogen or nutrients are taken up by the plant, the amounts of nitrogen or nutrients present in the plant, tissues thereof, or surrounding soil environment, and/or how efficiently the nitrogen or nutrients are incorporated or utilized by the plant.

As disclosed herein, resistance to pathogens or fungal growth includes, without limitation, increased plant survival upon infection with pathogen or fungal growth, a decreased growth rate or size of pathogen or fungal growth on or near the plant, or a diminished frequency with which pathogen or fungal growth appears on or near the plant.

As disclosed herein, arid conditions and arid soil conditions refer to any environment in which the plant and its immediate surroundings receive less than 50 mm of water per month. Arid conditions and arid soil conditions may also refer to any environment characterized by irregular exposure of plants to water, regardless of the total amount received.

As disclosed herein, low pH conditions and low pH soil conditions refer to any environment for plant growth with a pH of between about 0.0 to about 6.0, for example about 0.0, about 0.5, about 1.0, about 1.5, about 2.0, about 2.5, about 3.0, about 3.5, about 4.0, about 4.5, about 5.0, about 5.1, about 5.2, about 5.3, about 5.4, about 5.5, about 5.6, about 5.7, about 5.8, about 5.9, or about 6.0, or below any of these values, or between any two of these values. High pH conditions and high pH soil conditions refer to any environment for plant growth with a pH of about 6.1 to about 14, for example about 6.1, about 6.2, about 6.3, about 6.4, about 6.5, about 6.7, about 6.8, about 6.9, about 7.0, about 7.5, about 8.0, about 8.5, about 9.0, about 9.5, about 10, about 10.5, about 11, about 11.5, about 12, about 12.5, about 13, about 13.5, or about 14, or above any of these values, or between any two of these values.

As disclosed herein, low temperature and low temperature soil conditions refer to an ambient or soil temperature less than or equal to 15° C., for example less than or equal to −30° C., less than or equal to −25° C., less than or equal to −20° C., less than or equal to −15° C., less than or equal to −10° C., less than or equal to −9° C., less than or equal to −8° C., less than or equal to −7° C., less than or equal to −6° C., less than or equal to −5° C., less than or equal to −4° C., less than or equal to −3° C., less than or equal to −2° C., less than or equal to −1° C., less than or equal to −0° C., less than or equal to 1° C., less than or equal to 2° C., less than or equal to 3° C., less than or equal to 4° C., less than or equal to 5° C., less than or equal to 6° C., less than or equal to 7° C., less than or equal to 8° C., less than or equal to 9° C., less than or equal to 10° C., less than or equal to 11° C., less than or equal to 12° C., less than or equal to 13° C., less than or equal to 14° C., or less than or equal to 15° C., or less than or equal to any of these values, or between any two of these values. High temperature and high temperature soil conditions refer to an ambient or soil temperature greater than or equal to 50° C., for example greater than or equal to 15° C., greater than or equal to 20° C., greater than or equal to 25° C., greater than or equal to 26° C., greater than or equal to 27° C., greater than or equal to 28° C., greater than or equal to 29° C., greater than or equal to 30° C., greater than or equal to 31° C., greater than or equal to 32° C., greater than or equal to 33° C., greater than or equal to 34° C., greater than or equal to 34° C., greater than or equal to 35° C., greater than or equal to 36° C., greater than or equal to 37° C., greater than or equal to 38° C., greater than or equal to 39° C., greater than or equal to 40° C., greater than or equal to 41° C., greater than or equal to 42° C., greater than or equal to 43° C., greater than or equal to 44° C., greater than or equal to 45° C., greater than or equal to 46° C., greater than or equal to 47° C., greater than or equal to 48° C., greater than or equal to 49° C., or greater than or equal to 50° C., or greater than any of these values or between any two of these values.

VI. CONTACTING AND GROWING PLANTS WITH PLANT GROWTH-PROMOTING MICROBIAL ISOLATES

In some embodiments, plants are grown in the presence of PGPM isolates of the present disclosure. Any suitable method known in the art for growing plants in the presence of microorganisms and disclosed herein may be used. Moreover, any suitable method known in the art for preparing microbial isolates may be used for preparing PGPM isolated of the present disclosure for growing with plants. As disclosed herein, the PGPM isolates may be used in any state or temperature that does not adversely affect the viability of the isolates. For example, the PGPM isolates may be prepared as liquid cultures, lyophilized powders, air-dried powders, freeze-dried powders, beads, spores, aqueous slurries, gums, or prepared within soil or peat preparations.

In certain embodiments, growing a plant in the presence of one or more PGPM isolates of the present disclosure includes contacting the plant, parts thereof, seeds thereof, and/or rhizosphere thereof with one or more PGPM isolates of the present disclosure. Methods of contacting plants, parts thereof, seeds thereof, or rhizosphere thereof with microorganisms are well known in the art, and disclosed herein. Suitable methods may include, without limitation, inoculating the one or more PGPM isolates of the present disclosure into the growth medium of the plant. Exemplary growth media for plants may include, for example, soil and peat.

In some embodiments, growing a plant in the presence of one or more PGPM isolates of the present disclosure includes contacting one or more PGPM isolates of the present disclosure with plant seed. For example, plant seeds may be coated with the one or more PGPM isolates of the present disclosure, in liquid or solid suspensions, directly or in combination with any type of suitable carrier known in the art, including without limitation, any medium, suspension, powder, clay, oil, peat, and the like. Alternatively, the one or more PGPM isolates of the present disclosure may be absorbed into a granular carrier (e.g., pelleted peat) that is planted with the seed.

In other embodiments, growing a plant in the presence of one or more PGPM isolates of the present disclosure includes contacting one or more PGPM isolates of the present disclosure with a plant or part thereof. For example, the one or more PGPM isolates of the present disclosure may be added to any part of the plant, including without limitation, stems, flowers, leaves, nodes, aerial roots, and underground roots, using any suitable method known in the art. The one or more PGPM isolates of the present disclosure may be added at any time during plant growth, or in combination with any other treatment, for example, with fertilizers, pesticides, fungicides, or any combination thereof.

In further embodiments, growing a plant in the presence of one or more PGPM isolates of the present disclosure includes contacting one or more PGPM isolates of the present disclosure with plant roots or the plant rhizosphere. For example, the one or more PGPM isolates of the present disclosure may be encapsulated in beads or in any other carrier and applied to the plant roots or rhizosphere. Alternatively, the one or more PGPM isolates of the present disclosure may be added to the soil or other suitable growth medium containing the rhizosphere using any suitable method known in the art. As used herein, the plant rhizosphere may include, without limitation, roots, root nodules, root caps, root secretions, rhizosphere-associated microorganisms, and rhizosphere-associated soil.

As disclosed herein, the one or more PGPM isolates of the present disclosure may be used at any concentration or dose sufficient to increase one or more plant growth characteristics of a plant that is grown in the presence of such PGPM isolates.

In some embodiments, the plant is also grown in the presences of one or more rhizobial strains. The one or more rhizobial strains may be used in any ratio with the one or more PGPM isolates of the present disclosure that is sufficient to increase one or more plant growth characteristics of a plant that is grown in the presence of the PGPM isolates and rhizobial strains.

VII. DEPOSIT OF MICROORGANISMS

Table 3 lists the deposit strain name of the isolated plant growth-promoting microbial strains of the present disclosure and the NRRL accession number associated with each strain.

TABLE 3

| Strain Designation | NRRL Accession No. |
| --- | --- |
| *Variovorax boronicumulans* EBFNA2 | |
| *Fictibacillus phosphorivorans* EBFTY2 | |
| *Bacillus ginsengihumi* EBFTY3 | |
| *Rhizobium leguminosarum* EBFTY4 | |
| *Agrobacterium deltaense* EBF6ACT1 | |
| *Methylobacterium oryzae* EBF6NA2 | |
| *Rhizobium sophorae* EBF6NA4 | |
| *Bacillus safensis* subsp. *safensis* EBF6TY3 | |
| *Paenibacillus* sp. DMB5 Fava 2 | |
| *Bacillus licheniformis* Fava 6 | |
| *Bacillus tequilensis* Fava 10 | |

A deposit of each of the isolated microbial strains listed in Table 3 is maintained by The University of California, Los Angeles, having an address at 405 Hilgard Avenue, Los Angeles, Calif. 90095, United States of America. Access to these deposits will be available during the pendency of this application to persons determined by the Commissioner of Patents and Trademarks to be entitled thereto under 37 C.F.R. § 1.14 and 35 U.S.C. § 122. Upon allowance of any claims in this application, all restrictions on the availability to the public of the isolated microbial strains listed in Table 3 will be irrevocably removed by affording access to the isolated microbial strains listed in Table 3 with the Agricultural Research Service Culture Collection, (NRRL), 1815 North University Street, Peoria, Ill., 61604, USA.

VIII. EXAMPLES

The following examples are included to demonstrate embodiments of the invention. It should be appreciated by those of skill in the art that the techniques disclosed in the examples which follow represent techniques discovered by the inventors to function well in the practice of the invention, and thus can be considered to constitute certain modes for its practice. However, those of skill in the art should, in light of the present disclosure, appreciate that many changes can be made in the specific embodiments which are disclosed and still obtain a like or similar result without departing from the spirit and scope of the invention.

Example 1

Comparative Analysis of the Cultured and Total Bacterial Community in the Wheat Rhizosphere Microbiome Using Culture-Dependent and Culture-Independent Approaches Rhizosphere and root-associated bacteria are key components of crop production and sustainable agriculture. However, utilization of these beneficial bacteria is often limited by conventional culture techniques because a majority of soil microorganisms cannot be cultured using standard laboratory media. Therefore, the purpose of this study was to improve culturability and investigate the diversity of the bacterial communities from the wheat rhizosphere microbiome collected from three locations in Egypt with contrasting soil characteristics by using metagenomic analysis and improved culture-based methods. The improved strategies of the culture-dependent approach included replacing the agar in the medium with gellan gums and modifying its preparation by autoclaving the phosphate and gelling agents separately. Compared to the total operational taxonomic units (OTUs) observed from the metagenomic data sets derived from the three analyzed soils, 1.86 to 2.52% of the bacteria were recovered using the modified cultivation strategies, whereas less than 1% were obtained employing the standard cultivation protocols. Twenty-one percent of the cultivable isolates exhibited multiple plant growth-promoting (PGP) properties, including P solubilization activity and siderophore production. From the metagenomic analysis, the most abundant phyla were Proteobacteria, Actinobacteria, Chloroflexi, Bacteroidetes, and Firmicutes. Moreover, the relative abundance of the specific bacterial taxa was correlated with the soil characteristics, demonstrating the effect of the soil in modulating the plant rhizosphere microbiome.

Wheat (*Triticum aestivum* L.) is one of the most important food crops in the world. It is one of the key staple crops for global food security, providing 20% of the daily requirement of calories and protein in human nutrition (1). Current agricultural practices focus on improving wheat yield by changing the plant microbiome to improve its nutrition and resistance to pathogens and abiotic stressors (2, 3). However, plants also recruit and "engineer" their rhizobiome toward beneficial root symbionts (2) via the synthesis and secretion of specific root exudates (4). For example, the wheat rhizosphere consists of numerous beneficial plant growth-promoting rhizobacteria (PGPR) that contribute directly or indirectly to the growth and fitness of plants, by providing phytohormones, solubilizing nutrients, fixing nitrogen ($N_2$), employing biocontrol mechanisms against phytopathogens, and alleviating abiotic stresses (5-7). *Bacillus*, *Pseudomonas*, and *Stenotrophomonas* species are some examples of well-recognized PGPR that predominate in the wheat rhizosphere (5, 7, 8). Hence, it is very important to develop new methods and media for exploring cultivable PGPR, a possible key to future microbiome engineering solutions in sustainable agriculture (9).

Currently, only a minor portion of viable cells of microbial populations in nature can be cultured under laboratory conditions (10); indeed, the vast majority of microorganisms remain uncultured (11). This phenomenon is known as the "great plate count anomaly" (12). The recent development of sequencing technologies, including high-throughput sequencing based on 16S rRNA gene amplicons, has enabled researchers not only to provide new insights into uncultured microorganisms, but also to explore their potential functions in the environment (13, 14). Moreover, environmental microbes are important for sustainable agriculture, and culturing the "unculturable" is critical for their application to crops. Accordingly, many attempts have been made to develop more efficient methods of isolating as well as growing recalcitrant soil bacteria (15-17). These strategies include cultivation platforms that mimic natural environments (15), changing the type of solidifying agents (18), and modifying both growth media (17) and culture conditions (19).

Gelling agents are frequently used to solidify liquid culture media, usually in cultivating microbes of a single species. Historically, agar has been the predominant gelling agent in microbiological research, but a shortcoming in the preparation of agar-solidified medium is the difficulty in culturing microorganisms from diverse habitats because of how the agar is prepared (17, 20). Autoclaving agar together with phosphate generates hydrogen peroxide ($H_2O_2$), which limits both growth and colony formation of many microorganisms (20), whereas the separate sterilization of agar and phosphate improves the culturability of a wide range of microorganisms, including slow-growing bacteria (17), anaerobic bacteria (21), and rare actinobacteria (22), due to reduced $H_2O_2$ production. In addition to the inhibitory effect of the peroxides, agarase produced by some bacteria can interfere with agar solidification and reduce the number of discrete colonies formed on a plate (23). For these and other reasons, interest in exploring alternative gelling agents to improve microbe culturability has grown (24). Gellan gums such as Gelrite and Phytagel are water-soluble, nitrogen-free polysaccharides produced by *Sphingomonas* spp. (25). They do not contain phenolic compounds, which are toxic to several bacterial species (26). Gellan gum has become a significant substitute to replace agar for cultivating recalcitrant microorganisms (18, 27), which enables their isolation (26, 27). Although gellan gum produces some $H_2O_2$ when autoclaved together with phosphate buffer, its concentration is significantly lower than the concentrations produced in agar-based medium preparations (28).

Based on previous reports, the inventors hypothesized that testing new medium preparations, including alternative gelling agents, would increase the culturability of soil microbiome organisms. The inventors studied how the gellan gums Gelrite and Phytagel compared with agar affected the cultivability and diversity of bacterial communities, especially the PGPR, in the wheat rhizosphere microbiome isolated from three different soils from Egypt. The inventors also evaluated the impact of the separate sterilization of phosphate and solidifying agents on the isolation and colony formation of cultivable bacteria. In parallel, the inventors assessed the bacterial diversity in the wheat rhizosphere using cultivation-independent metagenomic analysis to understand better the influence of soil on microbial diversity.

Results

The three soil samples displayed differences not only in their mineral and physical compositions but also in pH, salinity, and organic matter. According to FAO-accepted classification (29, 30), the soil from the Luxor site is a clay loam, slightly alkaline (pH 8.00), and contains 52.20 ppm of total soluble N and 0.72% organic matter. The soil from the Minya site has a sandy structure, is slightly alkaline (pH 7.93), and has 14.30 ppm of total soluble N and 0.16% organic matter. The soil from the Nubaria site is a sandy loam and also calcareous (18.80% $CaCO_3$). In addition, it is moderately alkaline (pH: 8.51) and contains 16.40 ppm of total soluble N and 0.21% organic matter. Although the three soil samples are all classified as nonsaline, the soil sample from the Nubaria site is more likely to be affected by salt stress (electrical conductivity [EC], 0.84 dS $m^{-1}$) than the soil samples collected from the Luxor and Minya sites (EC, 0.62 and 0.33 dS $m^{-1}$, respectively).

Different strategies were applied to increase the magnitude of isolated bacteria from the three samples of wheat rhizospheric soil. Bacterial abundance was determined by direct cell counts on 7 medium preparations made with three solidifying agents (agar, Gelrite, and Phytagel) and based on two different growth media: LB medium and Jensen medium (JM) (FIG. 1). Although the numbers of CFU varied according to the soil type and growth medium, the highest numbers of CFU were obtained on substrates solidified with Phytagel under all tested conditions. For LB medium, the highest numbers of CFU were recorded using Phytagel followed by Gelrite and agar, respectively. The highest numbers of CFU ($[116.3\pm27.0]\times10^6$ cells $ml^{-1}$) were acquired on LB Phytagel medium for clay soil collected from the Luxor site, whereas the lowest numbers of CFU ($[2.08\pm0.51]\times10^6$ cells $ml^{-1}$) were found on LB agar medium in the sandy soil collected from the Minya location. For Jensen medium, a lower cultivability in all tested soils was obtained when phosphate and agar were autoclaved together (JM agar), indicating the inhibitory effect of the generated $H_2O_2$ on bacterial growth.

A total of 177 different pure colonies were selected according to their morphology, including 41 pure colonies from clay soil (Luxor), 84 pure colonies from calcareous soil (Nubaria), and 52 pure colonies from sandy soil (Minya). However, 11 bacterial colonies failed to be subcultured on their respective medium or any other media. The remaining 166 isolates (85 from LB medium and 81 from Jensen medium) were cultured on their respective media for DNA isolation and subsequently sequenced using the 16S rRNA gene to determine their phylogenetic positions.

Figure 2A:
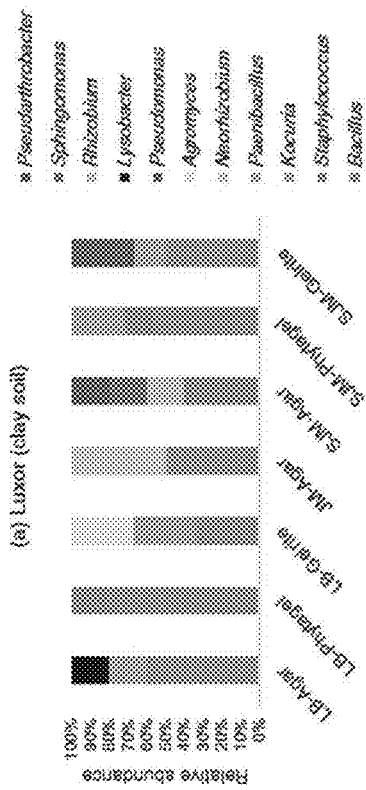
FIGS. 2A-2C. Bacterial taxonomic composition of cultivable fractions in the wheat rhizosphere microbiome collected from (FIG. 2A) Luxor, (FIG. 2B) Minya, and (FIG. 2C) Nubaria sites.
Figure 2B:
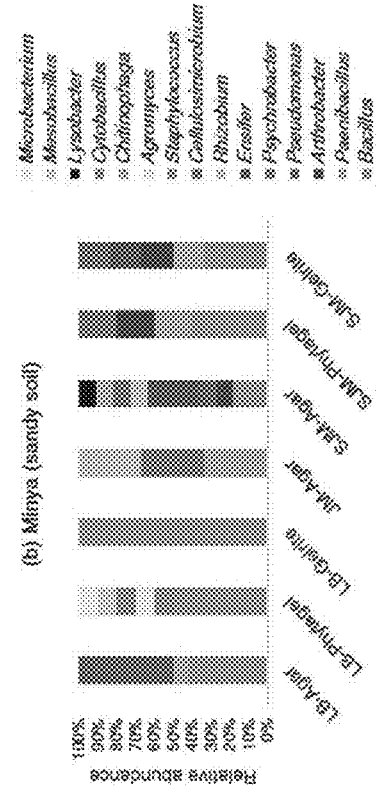
Figure 2C:
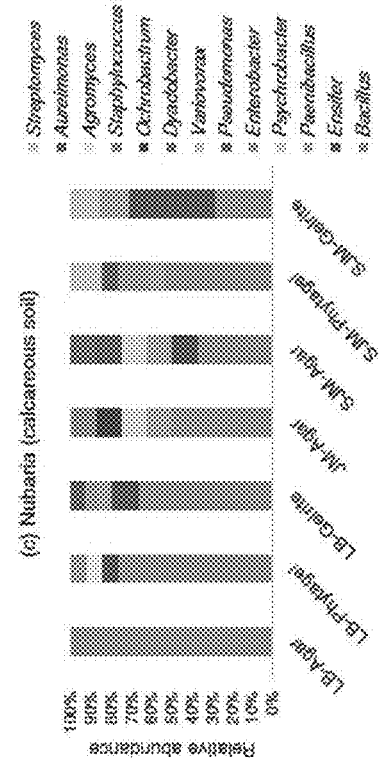

Generally, the structure of the cultured fractions of the bacterial communities was affected by a number of factors, including isolation medium, cultivation protocol, gelling agents, and soil type (FIG. 2). For LB medium, *Bacillus* was the predominant genus cultured in each of the three solidifying agents. The inventors found that LB substrates solidified with Phytagel and Gelrite resulted in a higher diversity of bacterial genera in sandy and calcareous soils, respectively. However, growth on agar and Gelrite resulted in the isolation of more diverse bacterial genera from clay soil compared to Phytagel. In general, most of the actinobacterial genera (for example *Agromyces, Microbacterium*, and *Streptomyces*) grew only on LB medium solidified with Phytagel and/or Gelrite. *Bacillus*-related genera also appeared to have a consistently higher relative abundance and diversity on LB medium solidified with Phytagel. Although the gelling gum agents supported the growth of *Aureimonas* and *Ensifer* genera belonging to the Alphaproteobacteria, growth of *Lysobacter* and *Pseudomonas* (Gammaproteobacteria) was observed only on LB plates solidified with agar.

For the Jensen medium experiments, autoclaving phosphate and agar separately (SJM agar) greatly improved the cultivability of diverse bacterial genera compared to the number of colonies obtained when phosphate and agar were autoclaved together (JM agar). For example, SJM agar medium supported the growth of bacterial genera from the phyla Actinobacteria (*Arthrobacter, Cellulosimicrobium*, and *Pseudarthrobacter*) and Bacteroidetes (*Dyadobacte* and *Chitinophaga*), whereas these genera failed to grow on JM agar medium. Also, the inventors found that the SJM agar medium favored the growth of many proteobacterial genera compared to the JM agar medium. Of note, *Ochrobactrum* (Nubaria) and *Neorhizobium* (Luxor), two alphaproteobacterial genera, were exclusively recovered from JM agar plates.

Comparisons at the genus level of the cultured bacteria obtained using the three different solidifying agents demonstrated that SJM agar substrate resulted in the growth of more diverse genera than did the substrates solidified by Phytagel and Gelrite. For example, members of the phylum Bacteroidetes (*Dyadobacter* and *Chitinophaga*) grew only on SJM agar plates. Conversely, *Variovorax*, the only representative of class Betaproteobacteria, grew only on Jensen medium solidified with Phytagel and Gelrite.

The phylogenetic analyses of the bacterial communities recovered from the three soil samples (FIG. 3) suggested that cultivation protocol and isolation medium might be stronger drivers of community structure than the type of solidifying agent. For example, despite the soil type, the actinobacterial genus *Arthrobacter* and the proteobacterial genus *Pseudomonas* grew on JM solidified by the three different gelling agents, but only when the phosphates and gelling agents were autoclaved separately (the PS protocol, where "P" is phosphate and "S" represents "separately"), and not when phosphates and gelling agents were autoclaved together (the PT protocol, where "T" represents "together"). The exceptions were two *Pararhizobium* strains, NGB-R154 and -R165, which grew only on JM solidified with agar and not with other gelling agents, even when the PS or PT protocols were used. The results substantiated the impact of substrate and potentially soil type on the culturable bacterial fractions. For example, isolates of the actinobacterial genus *Agromyces* from clay soil were recovered on LB medium solidified with Gelrite, whereas they grew only on LB substrate solidified with Phytagel if isolated from sandy and calcareous soils.

Figure 4A:
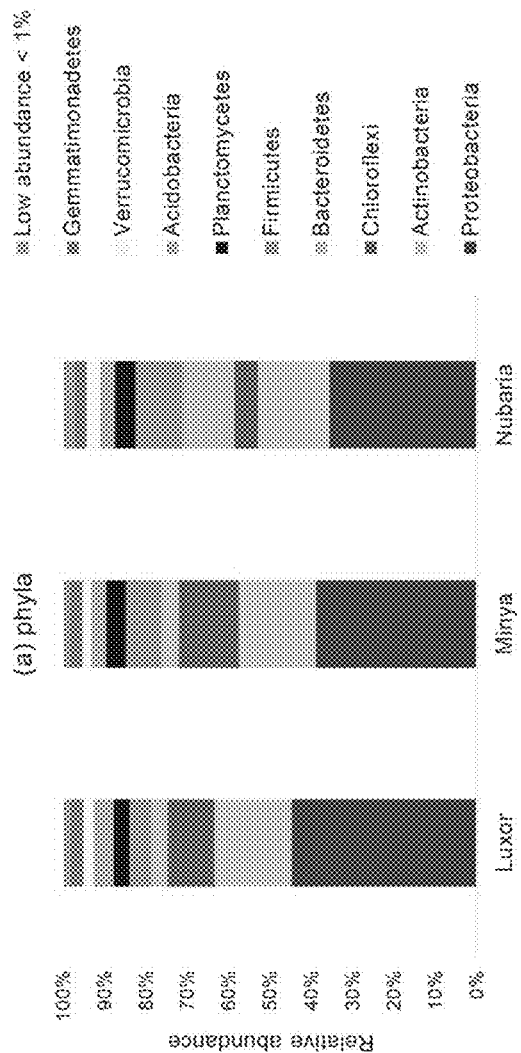
FIGS. 4A-4B. Main phyla (FIG. 4A) and classes (FIG. 4B) of bacteria identified in the wheat rhizosphere microbiome based on the metagenomic analysis; Luxor (clay soil), Minya (sandy soil), and Nubaria (calcareous soil).
Figure 4B:
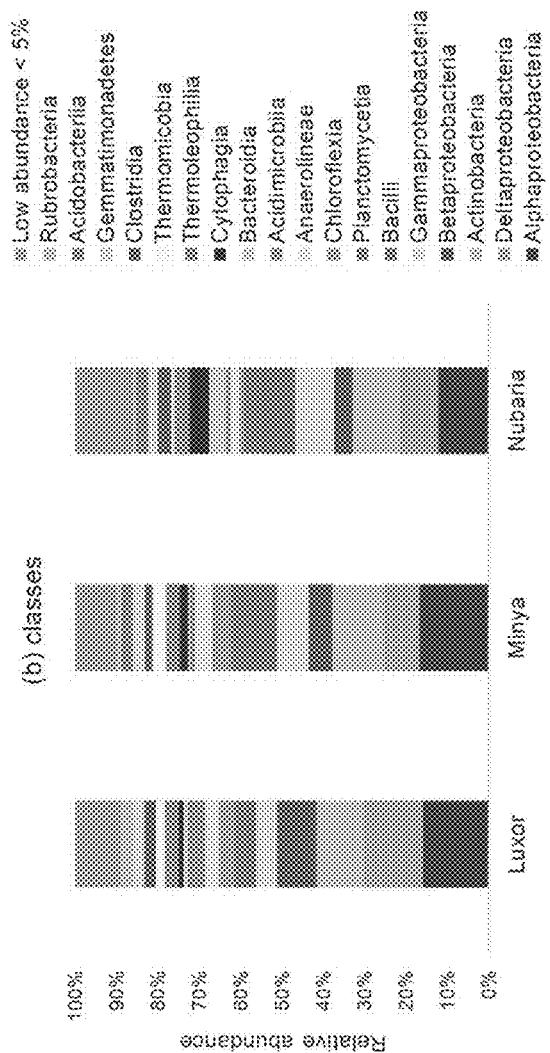

Based on the metagenomic analyses, the predominant sequences were represented by bacteria (>90%), and the relative abundances of bacteria in each soil sample were as follows: Luxor, 91.2%; Minya, 93.9%; and Nubaria, 91.5%. A very low percentage of eukaryotic microorganisms was detected in the Luxor and Minya soil samples (<1%), whereas the relative abundance of eukaryotes was higher in the Nubaria sample (6.7%). Compared to the eukaryotes, a low percentage of archaea was detected in the Nubaria soil sample (1.8%), whereas in soil samples collected from Luxor (8.1%) and Minya (5.4%), the percentages were higher. Phylotype classification of the operational taxonomic units (OTUs) indicated that of the 30 bacterial phyla, 21 represented less than 1% of the total OTUs detected in all the soil samples. Overall, it appears that the bacterial communities from the three soil samples are compositionally similar (FIG. 4a), with over 35% of the phyla being composed of the phylum Proteobacteria: Luxor, 40.8%; Minya, 36.6%; and Nubaria, 32.5%.

The second-most-abundant phylum consisted of Actinobacteria, which comprised <15% in each sample: Luxor, 17.2%; Minya, 17.5%; and Nubaria, 15.9%. Chloroflexi (4.9 to 13.5%), Bacteroidetes (3.9 to 11.7%), and Firmicutes (4.6 to 10.3%) were subdominant, but their abundance varied depending on the soil type. For example, Chloroflexi were more common in soils from Luxor and Minya (10.2 and 13.5%, respectively) than from Nubaria (4.9%). In contrast, representatives of Bacteroidetes and Firmicutes more frequently inhabited soils collected from Nubaria (11.7 and 10.3%, respectively) versus soils collected from Luxor (3.9 and 4.6%, respectively) and Minya (4.1 and 7.9%, respectively). In addition, a lower percentage of Planctomycetes, Acidobacteria, Verrucomicrobia, Gemmatimonadetes, and Cyanobacteria was detected in the three soil samples. At the class level (B), the structure of the bacterial community in the three soil samples was dominated by Alphaproteobacteria (11.1 to 15.7%), followed by Deltaproteobacteria (7.9 to 13.0%) and Actinobacteria (10.4 to 11.9%). Of the subdominants, the relative abundance of the Betaproteobacteria class was higher in the Luxor sample (8.6%) compared to the Minya (5.4%) and Nubaria (4.0%) soil samples. Finally, the rhizosphere of wheat plants cultivated in Minya and Nubaria exhibited high levels of Gammaproteobacteria (7.2 and 8.7%, respectively) and Bacilli (6.2 and 7.0%, respectively), whereas a lower level was detected in the rhizosphere of wheat plants cultivated in Luxor: 4.5 and 1.9%, respectively. At the genus level, the inventors found that the soils from Minya and Nubaria sites had more diverse genera (517 and 592 genera, respectively) than those identified in the Luxor soil sample (464 genera). For example, in the Luxor sample, the most dominant genera were *Pelobacter* (6.4%), "*Candidatus* Nitrososphaera" (5.8%), and *Rhodopseudomonas* (3.2%), whereas *Bacillus* (4.5%), *Arthrobacter* (4.4%), and *Pelobacter* (3.6%) were more frequently detected in the Minya soil sample. The most abundant genera in the Nubaria sample were *Bacillus* (5.3%), *Cytophaga* (3.3%), *Steroidobacter* (3.2%), and *Ohtaekwangia* (3.1%).

Figure 5A:
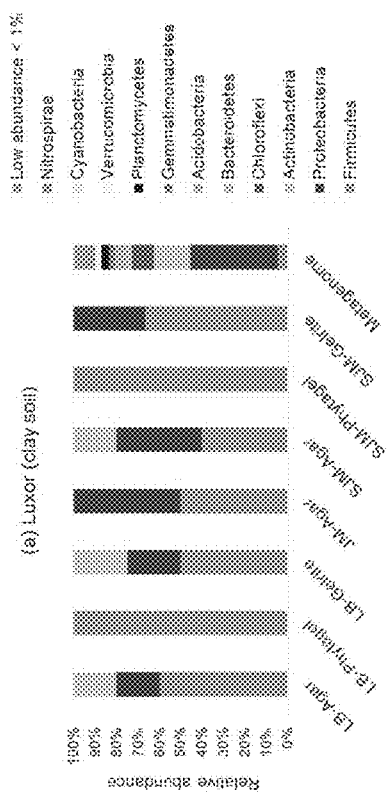
FIGS. 5A-5C. Comparison of metagenomic (culture-independent) and culture-dependent bacteria datasets at the phylum level distributed in wheat rhizosphere microbiome (FIG. 5A) Luxor, (FIG. 5B) Minya, and (FIG. 5C) Nubaria.
Figure 5B:
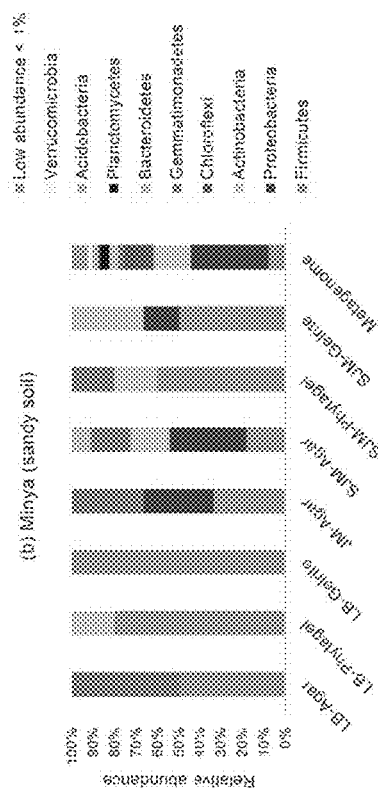
Figure 5C:
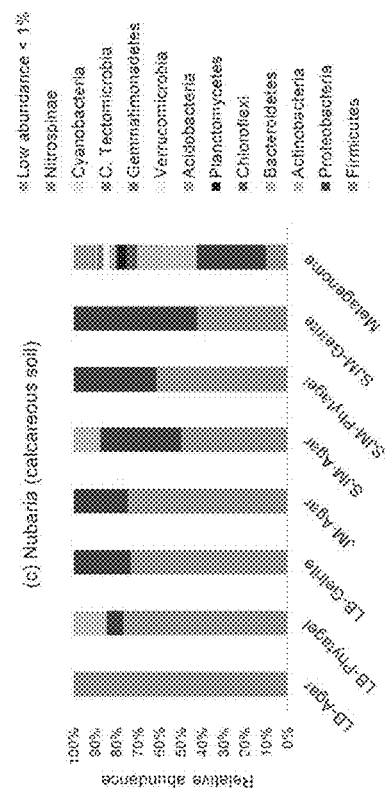

To clarify whether modifications of the culture method allowed the inventors to isolate more diverse bacteria, the inventors compared the taxonomic distributions of cultivable fractions from each culture condition preparation with those obtained by metagenomic analyses at the phylum level (FIG. 5) and class level (see FIG. 7). According to the results obtained from the three soil types, there were substantial differences in the phylogenetic compositions in the different culture preparations versus those obtained from the metagenomic data set. Of the 70 classes and 30 phyla identified in the metagenomic data sets, only 7 classes representing 5 phyla were recovered in the culture collection. At the phylum level, there were overwhelming numbers of cultivable Firmicutes from the three soil samples (40 to 100%, 18 to 100%, and 43 to 100% in the clay, sandy, and calcareous soils, respectively) compared to the abundances indicated by the metagenomic analyses (4.6, 7.9, and 10.3% in the clay, sandy, and calcareous soils, respectively) (FIG. 5). Also, although Alphaproteobacteria comprised the most dominant class in the metagenomic data sets, Bacilli made up the most frequent class found in the cultivable collection.

For LB medium, the effect of gelling agents in recovering diverse types of phyla varied, depending on the soil type. For instance, Actinobacteria comprised the second-largest phylum detected in the metagenomic data sets of the three soils (15.9 to 17.5%), and a similar proportional trend was observed in the culture collection obtained on LB medium solidified with Phytagel from the sandy and calcareous soils (20 and 15.4%, respectively), whereas no Actinobacteria were detected on this medium using the same protocol from clay soil. Conversely, a higher proportion (33.3%) was detected in the culture collection recovered on LB medium solidified with Gelrite from the clay soil, but no Actinobacteria were evident following the same protocol using sandy and calcareous soils. However, for Jensen medium, regardless of the soil type, the results indicated that the cultivable fractions of bacteria obtained on agar medium using the PS protocol (SJM agar) were more similar to the data from the cultivation-independent method than the bacteria obtained using other medium preparations. Based on the comparison to the metagenomic analyses of the three soil types, the inventors concluded that the SJM agar medium tended to be less biased in terms of bacterial isolate cultivation than the other culture preparations/protocols.

Finally, the inventors obtained cultivable isolates that were detected only using the plate-culturing techniques, and were not found in the metagenomic data sets. These isolates were identified as *Kocuria* and *Pseudarthrobacter* spp. (in the clay soil), *Microbacterium* and *Psychrobacter* spp. (in the sandy soil), and *Aureimonas* and *Variovorax* spp. (in the calcareous soil).

Figures 6A, 6B:
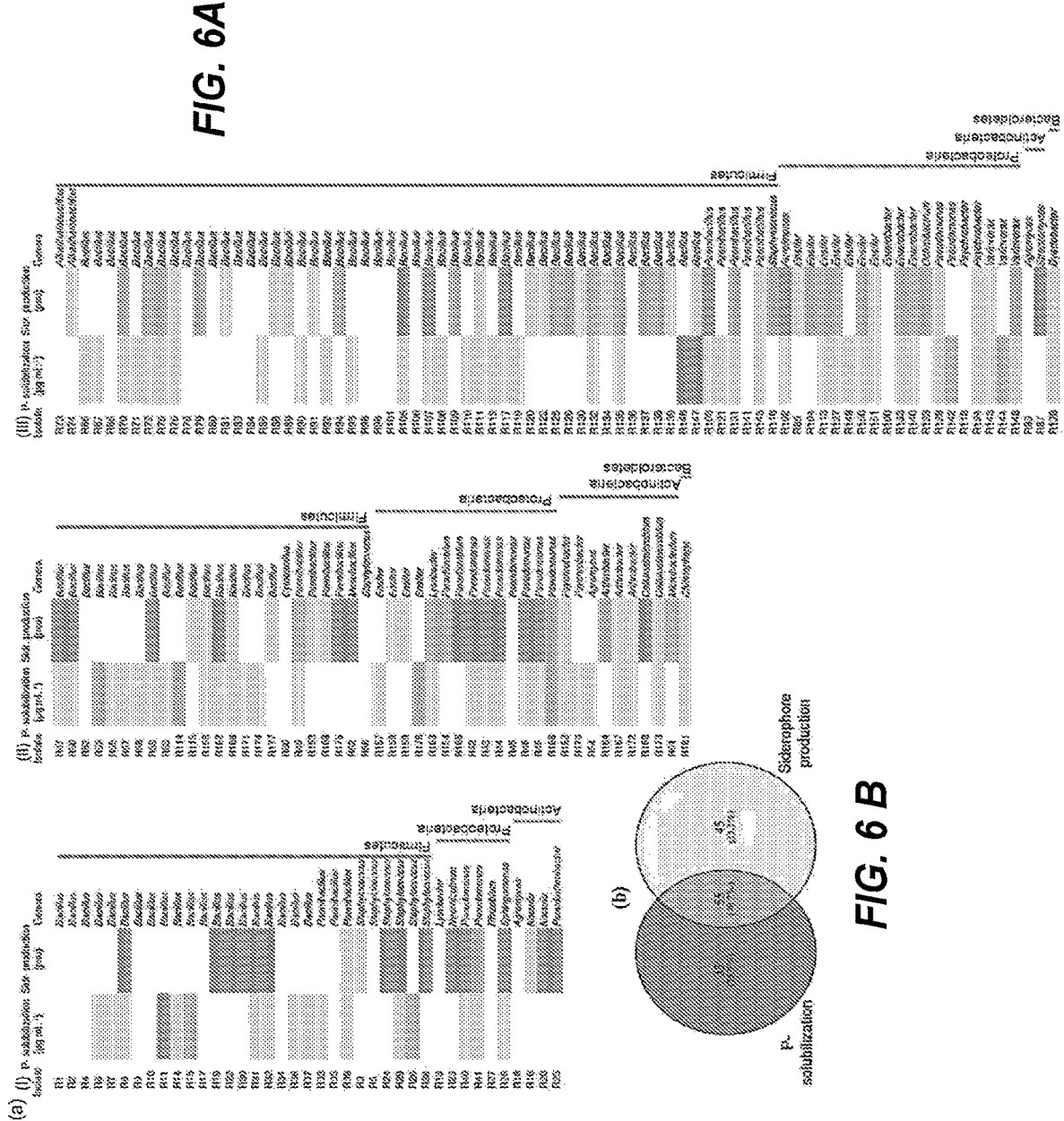
FIGS. 6A-6B. PGP characteristics of cultivable isolates.
Figure 8:
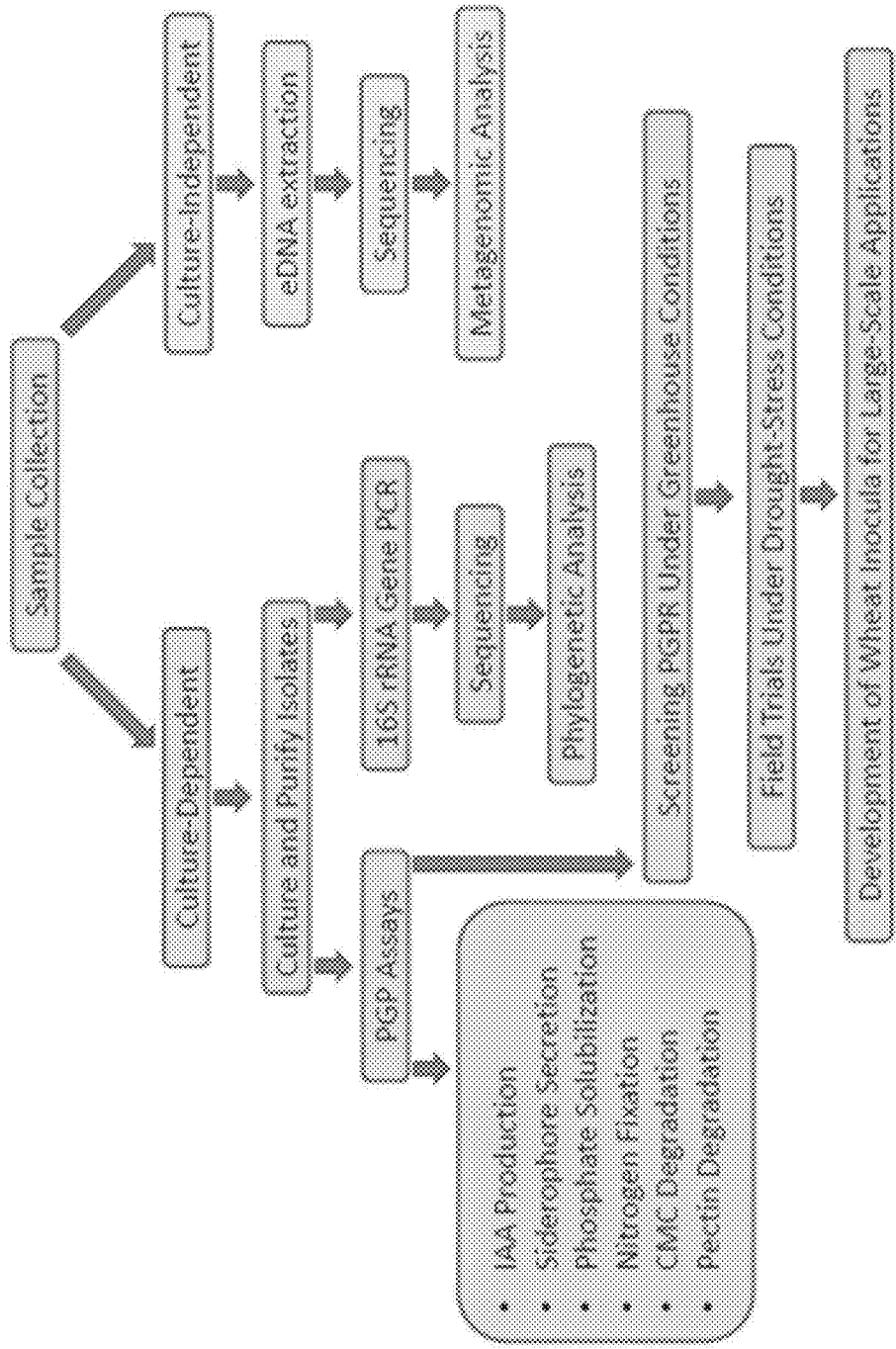
FIG. 8. Flowchart for collection and analysis of bacterial isolates.

Because most of the identified microbial genera in the wheat microbiomes from the three different sites are known to exhibit PGP traits—for example, *Bacillus, Paenibacillus,* and *Pseudomonas*—the inventors screened the culture collection for two traits that are commonly associated with PGP activities. The inventors tested for phosphate solubilization and siderophore production because each one is associated with plant nutrition and also linked to biofertilization, phytostimulation, and biocontrol. These PGP traits were evaluated in vitro on 166 cultivable strains that were isolated from the rhizosphere of wheat plants at the three sites (FIG. 6). The results showed that 60% were siderophore positive in plate assays, and 54% exhibited phosphate solubilization ability based on the use of agar-solidified, conventional Pikovskaya medium (31). Out of the 166 bacterial strains recovered from the rhizosphere so far, 55 exhibited both phenotypes and were consistently found in the three environments (16, 35, and 49% in the clay, sandy, and calcareous soil types, respectively). Of those, 38% were identified as *Bacillus*, 16% as *Pseudomonas*, and 11% as *Paenibacillus*. The rest of these isolates were classified as *Arthrobacter, Aureimonas, Cellulosimicrobium, Chitinophaga, Dyadobacter, Ensifer, Enterobacter, Sphingomonas, Staphylococcus,* and *Variovorax*. Interestingly, 81% of the analyzed isolates exhibited at least one of the two evaluated PGP traits.

Many factors influence the culturability of microbes, such as the culture medium (e.g., medium composition and solidifying agents), growth conditions, and other cultivation techniques (21, 32, 33). Any modifications of these approaches may promote the growth of taxa that did not grow under the original conditions (34). For this purpose, multiple strategies were implemented in this study to increase the culturability percentages of bacterial communities associated with the rhizosphere of wheat plants from soils with different characteristics. Generally, the inventors found that the gelling agent and slight changes in medium preparation were the key drivers for structuring the cultured communities in terms of viable cell counts and diversity (FIGS. 1 and 2). Replacing agar with Phytagel in the case of LB medium increased CFU counts ranging from 30 to 180% in three soil samples. Similarly for the Jensen medium experiments, where agar was replaced with Phytagel and the PS protocol was used (SJM Phytagel), 61 to 273% and 10 to 127% more CFU counts compared to the JM agar medium (PT protocol) and SJM agar medium (PS protocol), respectively, were measured. The inventors' findings are in agreement with previous publications supporting the use of gellan gum as a solidifying agent because it resulted in higher CFU counts and greater culturability of bacteria isolated from soil (32, 35) or seawater (18) than agar. The variation in culturability observed between gellan gum substrates and agar-based substrates may be due to the possibility that the two solidifying agents are composed of different sugars, each supporting the growth of specific phylotypes of microorganisms (18, 27). However, other reasons, including the accumulation of inhibitory substances or changes in components during autoclaving, may also be responsible for decreased growth in agar. Also, too high of an agar concentration is reported to limit microbial growth (36).

Concerning the method of medium preparation, the results showed that Jensen substrates when prepared using the PS protocol amended with the three different solidifying agents gave a higher colony count than the Jensen agar medium using the PT protocol (FIG. 1). Furthermore, the bacterial diversity obtained using PS medium was more reflective of the original community in the three soil samples than that obtained with PT medium (FIG. 2), again demonstrating that the PS protocol is more effective than the PT for isolating diverse genera of bacteria. This could be due to the inhibitory effect of $H_2O_2$ generated from the autoclaving of the gelling agents and phosphate together (20), and indeed separate autoclaving of the gelling agents and phosphate buffer resulted in much lower $H_2O_2$ concentrations and increased culturability of microorganisms (20, 28). The inventors' data are also in agreement with previous publications, which reported that the PS technique is very effective for cultivating recalcitrant and novel bacterial taxa from various environments (8, 17, 21). Remarkably, isolates classified into *Ochrobactrum* and *Neorhizobium* were recovered only on Jensen medium solidified with agar following the PT protocol. The inventors do not have a clear explanation of this finding, but these isolates may require $H_2O_2$ or unknown chemicals generated during autoclaving of phosphate and agar together for their cultivability.

Among the total OTUs revealed from the metagenomic data sets in the three analyzed soils, fewer than 1% of bacterial communities associated with the rhizosphere of wheat plants grew on LB medium and Jensen medium solidified with agar following standard protocols (LB agar and JM agar) (see Fig. S2 in the supplemental material). The modified medium preparations, including the use of alternative gelling agents, increased the percentage of the recovered bacterial genera from 1.86% to 2.52%, depending on the soil type, supporting the conclusion that large numbers of bacteria remain uncultured (11).

The inventors also observed a clear bias in results that can occur due to modifications in the method of medium preparation or addition of solidifying agents. For example, using the traditional amended agar medium (LB agar or JM agar), only one actinobacterial strain assigned to *Kocuria* sp. was recovered. However, the improved culture methods identified a complex actinobacterial community, including 6 actinobacterial genera (*Agromyces, Arthrobacter, Cellulosimicrobium, Microbacterium, Pseudarthrobacter,* and *Streptomyces* spp.) in addition to *Kocuria* spp. Similar to the inventors' findings, Adam et al. (22) obtained difficult-to-culture Actinobacteria—classified not *Agromyces, Amycolatopsis, Kocuria, Micrococcus, Micromonospora, Nocardia, Rhodococcus,* and *Streptomycetes* spp.—on ISP medium using the PS protocol, whereas only *Streptomyces* spp. were detected on the PT medium.

Although the cultivation-independent approach provides deep knowledge of viable bacterial communities from various environmental sources, it has many limitations. For example, some of the cultivable bacteria cannot be detected based on primer mismatches, or the diversity of certain taxa may be overestimated (37). In the present study, some of the isolated bacteria could not be detected in the metagenomic analyses, perhaps due to the bias of the selected primers or sequencing depth (34). The inventors' data are in agreement with those of other researchers who found that certain genera of cultivable bacteria from soil (38) or marine sediments (34) were not detected using the amplicon sequencing method.

The metagenomic analyses characterizing the wheat rhizosphere revealed that Proteobacteria, Actinobacteria, Chloroflexi, Bacteroidetes, and Firmicutes were the dominant phyla residing in this rhizosphere in the three different soil samples. A similar phylum profile was previously described in the wheat rhizosphere microbiome grown in different regions of the world (37, 39-41). Abundant classes observed in this study were Alphaproteobacteria, Deltaproteobacteria, Actinobacteria, Betaproteobacteria, Gammaproteobacteria, and Bacilli, which is consistent with other studies that described the rhizosphere communities of different wheat varieties cultivated in Poland (37) and Pakistan (40). These results supported earlier conclusions that wheat plants recruit a core microbiome that is consistent across locations with different soil and environmental characteristics (2). In an extensive study characterizing wheat rhizosphere microbiomes across eight African and European soils, Simonin et al. (3) observed that 177 taxa were consistently detected in the wheat rhizosphere, constituting a core microbiome. Interestingly, the inventors observed OTU variation in the calcareous soil collected from the Nubaria region compared to the other soil locations. This could be explained by differences in soil parameters, especially values of pH and electrical conductivity. In support of the effect of environmental factors, the rhizospheric soil in Nubaria is more alkaline (pH 8.51) and saline (EC, 0.84 dS m$^{-1}$) than the other soil samples. This result is consistent with previous studies demonstrating that soil pH (3, 37, 40, 42) and salinity (43) play a significant role in shaping the wheat rhizosphere microbiome.

Figure 3A:
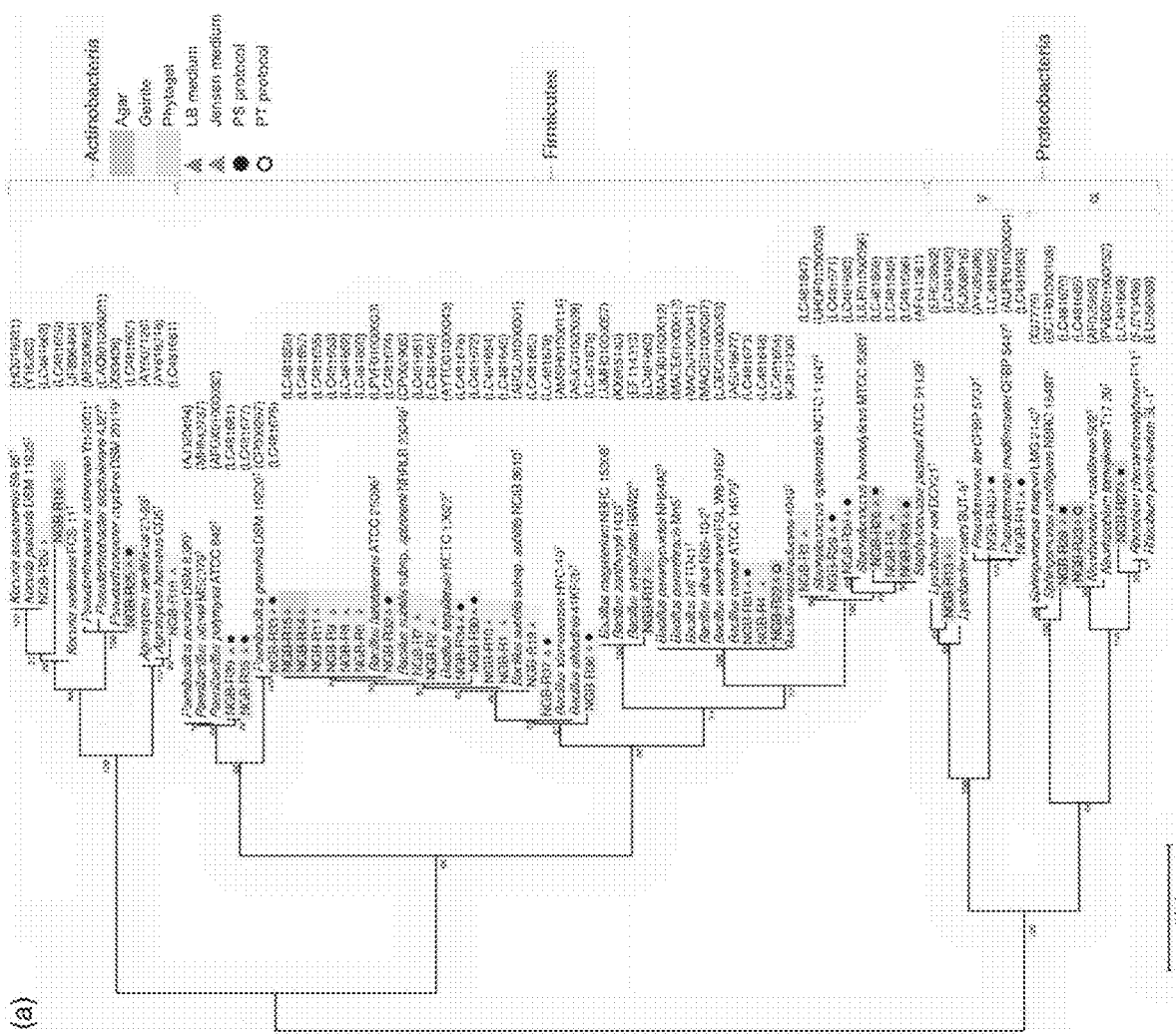
FIGS. 3A-3C. Maximum-likelihood phylogenetic trees based on 16S rRNA gene sequences of cultivable bacterial isolates obtained from (FIG. 3A) clay soil at Luxor site, (FIG. 3B) sandy soil at Minya site, and (FIG. 3C) calcareous soil at Nubaria site. Bootstrap values are indicated for each node (1000 replicates). NGB-R: National Gene Bank-Rhizobacteria. PT protocol (phosphates and gelling agent autoclaved together) and PS protocol (phosphates and gelling agent autoclaved separately).
Figure 3B:
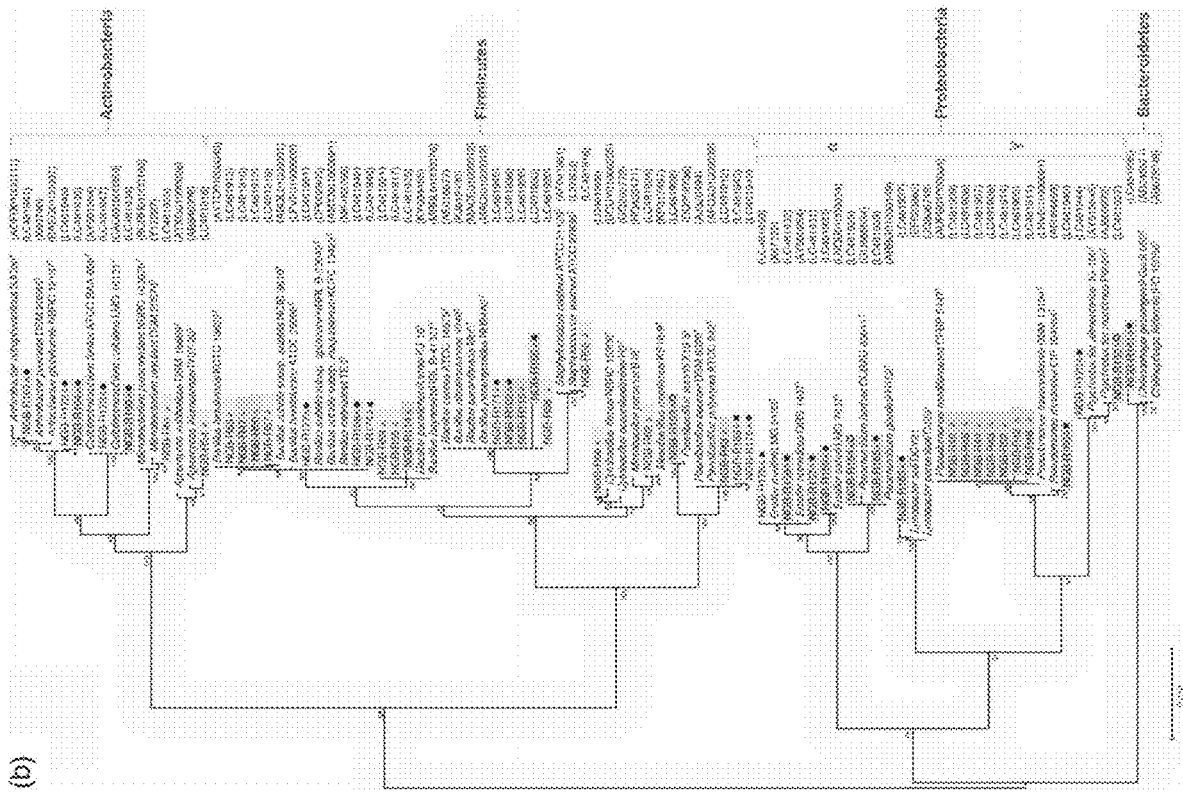
Figure 3C:
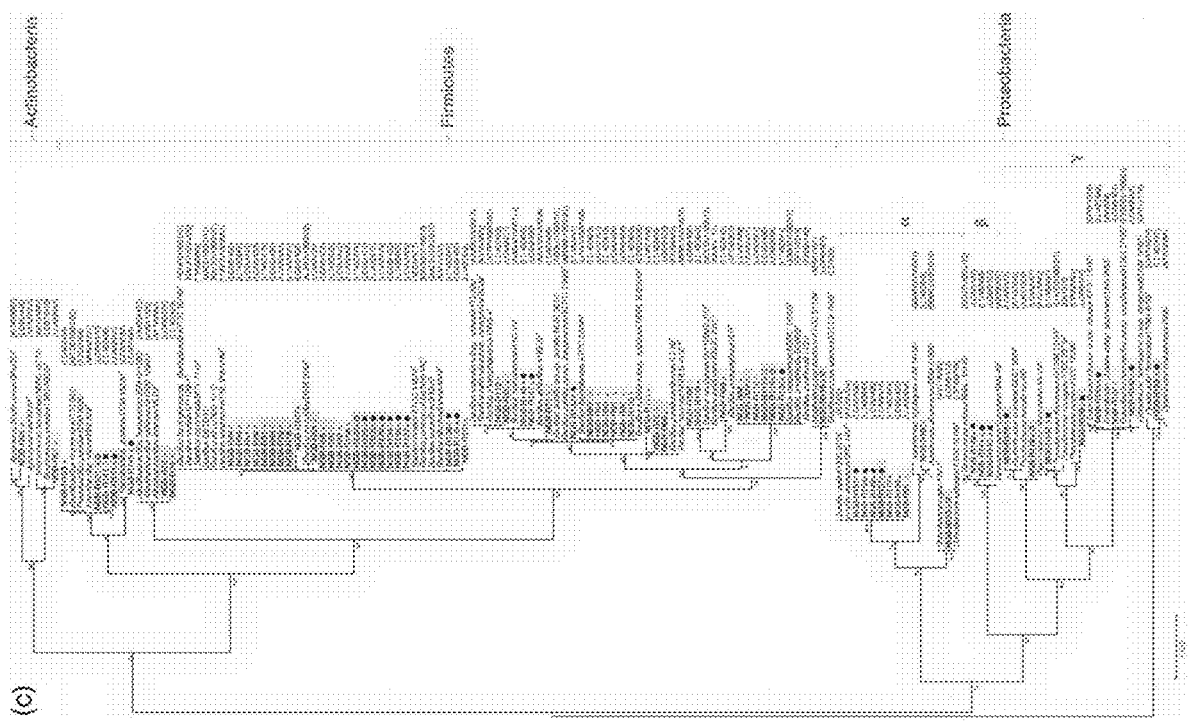

Using different plate-culturing techniques, the inventors obtained 166 cultivable isolates, which were highly diverse at the genus level, from the three analyzed soils of the wheat rhizosphere microbiome (FIG. 3). The inventors found that a high proportion of these isolates had the potential for PGP activities for nutrient acquisition, such as siderophore production and P solubilization (FIG. 6). Most of these isolates were classified as *Bacillus, Paenibacillus, Pseudomonas, Enterobacter*, and *Sphingomonas* spp., all of which are well-known PGPR with beneficial effects on wheat growth and health under controlled and field conditions (44-46). However, these isolates were tested only on the original Pikovskaya medium (31), which may not be an appropriate diagnostic indicator of phosphate solubilization activity (47). Additional tests to verify phosphate solubilization ability need to be performed.

In a previous study, Sheirdil et al. (45) reported the PGPR potential of *Bacillus* and *Pseudomonas* strains isolated from the wheat rhizosphere based on ACC deaminase activity, P solubilization ability, and siderophore production, with the potential for improving the growth of wheat plants under low inputs of chemical fertilizers in field experiments. The inventors' results demonstrated that isolates belonging to *Ensifer* and *Dyadobacter* spp. were also identified as promising PGPRs. Consistent with the inventors' findings, there are numerous reports describing the PGP activities of *Ensifer* sp., many of which are N$_2$ fixers (48, 49); however, there is currently little evidence for *Dyadobacter* spp. acting as PGPR (50).

Materials and Methods

Study Area and Soil Sampling.

Rhizosphere soil of wheat plants (variety Misr 1) was collected in triplicate from three regions: the Nubaria region (El Beheira Governorate, Lower Egypt), Mallawi (Minya Governorate, Middle Egypt), and El Matanah (Luxor Governorate, Upper Egypt) (see FIG. S3 in the supplemental material). The soil samples were collected when the wheat plants reached the tillering stage (50 to 60 days after sowing). The soil was gathered from the wheat rhizosphere by gently removing the plants and obtaining the soil attached to the roots, followed by a thorough mixing that yielded a composite sample from each site. A total of 0.5 kg of the soil from each of the three sites was sent to UCLA for metagenomic analysis. Physical and chemical analyses of the collected soil samples were made (51).

Analysis of Bacterial Diversity Using Culture-Dependent Techniques.

For each composite soil sample, 10 g of soil was suspended in 90 ml of sterile distilled water and vortexed thoroughly for 1 h at 150 rpm. From this stock solution, serial dilutions were performed to $10^{-7}$. Three replicates of 100 μl from dilutions of $10^{-3}$ to $10^{-7}$ were plated onto either nonselective Luria-Bertani (LB) medium (52) (48501; Serva, Heidelberg, Germany) or selective Jensen medium (53), a culture medium that supports the growth of some nitrogen-fixing bacteria (20.0 g liter$^{-1}$ sucrose, 1.0 g liter$^{-1}$ K$_2$HPO$_4$, 0.5 g liter$^{-1}$ MgSO$_4$.7H$_2$O, 0.5 g liter$^{-1}$ NaCl, 0.1 g liter$^{-1}$ FeSO$_4$.7H$_2$O, 2.0 g liter$^{-1}$ CaCO$_3$, 0.005 g liter$^{-1}$ Na$_2$MoO$_4$H$_2$O). The two media were solidified with either 1.5% agar (11392; Serva, Heidelberg, Germany), 1% Phytagel (P8169; Sigma-Aldrich, USA), or 0.75% Gelrite (22168; Serva, Heidelberg, Germany). For LB medium, individual solidifying agents were autoclaved together with the medium components. In contrast, as described earlier, Jensen medium (JM) was prepared by using two different protocols, PS and PT, to minimize hydrogen peroxide formation. The results were then compared with traditional Jensen medium solidified by agar with all of the components autoclaved together (PT). After inoculation, the petri dishes were incubated at 28° C. for 6 days. The number of CFU on each plate was counted during the incubation. Only plates with 20 to 200 CFU were recorded. Bacterial colonies with different shapes, sizes, and colors were purified separately by subculture on their respective media.

Total genomic DNA from individual colonies was isolated using a GeneJet Genomic DNA purification kit (Fermentas, Thermo Scientific, EU). The procedures were done according to the manufacturer's instructions. Bacterial 16S rRNA genes were amplified using the 27F/1492R primers (54, 55). PCR was performed using the standard reaction mixture (25 μl) containing 1×PCR buffer, 1.5 mM MgCl$_2$, 5% dimethyl sulfoxide, 200 mM each deoxynucleoside triphosphates (dNTPs), 15 pmol of each primer, 1 U of Taq polymerase enzyme (Promega Corporation, Madison, WI, USA), and 50 ng of DNA template. Thermal cycling conditions were as follows: initial denaturation at 94° C. for 5 min, followed by 30 cycles of 94° C. for 1 min, 55° C. for 1 min, and 72° C. for 1 min, and a final elongation at 72° C. for 10 min. 16S rRNA gene sequencing was performed at Macrogen, Inc., South Korea. Sequence reads were edited and assembled using DNASTAR software (Lasergene, Madison, WI, USA). The taxonomical identification of bacterial isolates was done to the genus level by BLAST analysis of partial 16S rRNA gene sequences at the GenBank (ncbi.nlm.nih.gov), EzBioCloud (eztaxon-e.ezbiocloud.net), and Ribosomal Database Project (RDP) (rdp.cme.msu.edu) databases. The sequences were aligned using ClustalW version 1.8 (56) and were subjected to phylogenetic analyses. Phylogenetic trees were reconstructed using the maximum likelihood (ML) algorithm (57) in MEGA X version 10 (58) using the Jukes-Cantor model. Bootstrap support (BT) for each node was evaluated with 1,000 replicates.

Characterization of the Cultured Bacteria for PGP Traits.

(i) Phosphate (P) Solubilization.

A quantitative analysis of P solubilization activity was performed using the molybdate blue color method (59). Briefly, bacterial isolates were inoculated in 25 ml Pikovskaya broth medium (31) and incubated for 7 days at 28° C. with shaking at 150 rpm. Bacterial cultures were centrifuged at 15,000 rpm for 30 min. The supernatant (1 ml) was mixed with 10 ml of chloromolybidic acid and the volume was made up to 45 ml with distilled water. Cholorostannous acid (0.25 ml) was added, and the volume was brought up to 50 ml with distilled water. The absorbance of the developing blue color was measured by spectrophotometry (Thermo, USA) at 600 nm. The amount of solubilized phosphate was detected using a standard curve produced with dilutions of a $KH_2PO_4$ solution (Sigma-Aldrich, USA).

Siderophore Production.

Bacterial isolates were assayed for siderophore production using a modified microplate method (60). All bacterial isolates were inoculated in LB broth medium, then 0.1 ml of overnight culture supernatant was mixed with 0.1 ml of chrome azurol S (CAS) reagent. Absorbance was measured at 630 nm against a reference consisting of 0.1 ml of uninoculated broth and 0.1 ml of CAS reagent. Siderophore production was expressed in percent siderophore units (PSU), which was calculated according to the formula siderophore production $(PSU)=(A_r-A_s)/A_r \times 100$, where $A_r$ is the absorbance of the reference (CAS solution and uninoculated broth) and $A_s$ is the absorbance of the sample (CAS solution and cell-free supernatant of the sample) (61).

Analysis of Bacterial Diversity Using Culture-Independent Techniques.

Environmental DNA (eDNA) was isolated from 0.5-g rhizosphere soil samples collected from the Nubaria, Minya, and Luxor sites using a DNeasy PowerSoil Pro DNA isolation kit (Qiagen, Germany) following the manufacturer's instructions. 16S rRNA amplicon library preparation and sequencing were performed by MR DNA analysis service (mrdnalab.com; MR DNA Shallowater, TX, USA). The hypervariable region V4 of the 16S rRNA gene was amplified using the universal primer pair 515F/806R with the HotStarTaq Plus master mix kit (Qiagen, Valencia, CA) under the following conditions: 94° C. (3 min), followed by 30 cycles of 94° C. for 30 s, 53° C. for 40 s, and 72° C. for 1 min, after which a final elongation step at 72° C. (5 min) was performed. PCR products were purified using Ampure XP beads (Beckman Coulter, Inc., Brea, CA) and then were used to prepare an Illumina DNA library. The final amplicon libraries were sequenced on the Illumina MiSeq platform (Illumina Inc., San Diego, CA) following the manufacturer's guidelines.

Sequence data were processed using a proprietary analysis pipeline (mrdnalab.com; MR DNA, Shallowater, TX, USA) and were clustered using the Usearch program (version 11.0.667) (drive5.com/usearch). Paired-end reads were merged, depleted of barcodes, and low-quality reads and short reads (<150 bp) were discarded. Chimeric sequences were removed and OTUs were generated. OTUs were defined by clustering at 3% divergence (97% similarity). OTUs were submitted to the RDP classifier (rdp.cme.msu.edu) and NCBI (ncbi.nlm.nih.gov) to obtain the taxonomy assignment. Finally, the generated OTUs were compiled into each taxonomic level into both "counts" and "percentage" files, where the "count" files contain the number of sequences, and the "percentage" files contain the relative percentage or proportion of sequences within each sample.

Data Availability.

The sequence data from BLAST analysis of partial 16S rRNA gene sequences from GenBank, EzBioCloud, and the RDP were submitted to the NCBI database under accession no. LC482422 to LC482500, LC481905 to LC481951, and LC481645 to LC481683 for cultivable bacteria in the wheat rhizosphere microbiome collected from the Nubaria, Minya, and Luxor sites, respectively. The metagenomic amplicon libraries were sequenced on the Illumina MiSeq platform (Illumina, Inc., San Diego, CA) following the manufacturer's guidelines. The sequencing data from sequencing of the metagenomic amplicon libraries on the Illumina MiSeq platform were deposited in the NCBI database (ncbi.nlm.nih.gov) under accession no. MZ974967 to MZ976766 (Luxor), MZ973013 to MZ974947 (Minya), and MZ971364 to MZ972785 (Nubaria).

Example 2

Promotion of Plant Growth by Plant Growth-Promoting Bacteria

Pot Trials

Seeds of one or more of the following plant types are selected: *Zea mays* L. (Corn Golden Bantam), *T. aestivum* (wheat), *Sorghum bicolor* (sorghum), *Vigna unguiculata* (cowpea), *V. faba*, *V. subterraneana* (Bambara groundnut), *Lebeckia ambigua*, *Macroptilium atropurpureum* (siratro), *Macroptilium atropurpureum* (hyacinth bean), and *Tephrosia virginiana* (goat's rue). Seeds are surface-sterilized by immersing them in 70% ethanol for 1 min, followed by three rinses with sterile distilled water (SDW). For the treatments, the seeds are bacterized for 3 h by imbibing them in a bacterial suspension, which has been grown for 48 h to contain approximately $10^9$ CFU/ml. Seeds imbibed in LB medium serve as a control. The treatments consist of control and PGPB-treated plants grown in sterile Sungro Potting Mix containing mainly Canadian sphagnum peat moss. Seeds are bacterized with one or more PGPBs selected from *Variovorax boronicumulans* EBFNA2, *Fictibacillus phosphorivorans* EBFTY2, *Bacillus ginsengihumi* EBFTY3, *Rhizobium leguminosarum* EBFTY4, *Agrobacterium deltaense* EBF6ACT1, *Methylobacterium oryzae* EBF6NA2, *Rhizobium sophorae* EBF6NA4, *Bacillus safensis* subsp. *safensis* EBF6TY3, *Paenibacillus* sp. DMB5 Fava 2, *Bacillus licheniformis* Fava 6, and *Bacillus tequilensis* Fava 10.

Multiple replicates of each treatment are maintained. Soil moisture is maintained to approximately 20% with water. Plants in all the treatments are grown in parallel and harvested at the same time after an appropriate time for the particular plant species being grown (e.g., 45 days). Measurements on morphological parameters, namely shoot length and root length, are recorded at the time of harvesting. Plant dry weight measurements are made after drying the plants in a 60° C. oven. The trial is repeated multiple times and the data are generated from the pooling of all the trials.

Shoot length, root length, and dry plant biomass are increased for the plants grown from the PGPB-bacterized seeds relative to the control seeds.

Microplot Studies

Untreated control seeds and PGPB-treated seeds are sown in a microplot (2 m×2 m) in an outside garden in multiple rows for each treatment. Seeds are treated as described above. Each row has multiple plants. Harvesting is carried out after an appropriate amount for the particular plant species being tested (e.g., 120 days), followed by the recording of the plant data. The experiment is repeated multiple times, and the data are generated from the pooling of all trials.

Shoot length, dry plant biomass, and cob yield are increased for the plants grown from the PGPB-bacterized seeds relative to the control seeds.

All of the methods disclosed and claimed herein can be made and executed without undue experimentation in light of the present disclosure. While the compositions and methods of this invention have been described in terms of certain embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims. All references, cited literature articles, patent publications, and sequences associated with any recited GenBank accession numbers are specifically incorporated herein by reference in their entirety for all purposes.

REFERENCES

The following references, to the extent that they provide exemplary procedural or other details supplementary to those set forth herein, are specifically incorporated herein by reference.

1. Giraldo P, Benavente E, Manzano-Agugliaro F, Gimenez E. 2019. Worldwide research trends on wheat and barley: a bibliometric comparative analysis. Agronomy 9:352. 10.3390/agronomy9070352.
2. Schlatter D C, Yin C, Hulbert S, Paulitz T C. 2020. Core rhizosphere microbiomes of dryland wheat are influenced by location and land use history. Appl Environ Microbiol 86:1-21. 10.1128/AEM.02135-19.
3. Simonin M, Dasilva C, Terzi V, Ngonkeu E L M, Diouf D, Kane A, Berm G, Moulin L. 2020. Influence of plant genotype and soil on the wheat rhizosphere microbiome: evidences for a core microbiome across eight African and European soils. FEMS Microbiol Ecol 96:fiaa067. 10.1093/femsec/fiaa067. PubMed.
4. Vishwakarma K, Kumar N, Shandilya C, Mohapatra S, Bhayana S, Varma A. 2020. Revisiting plant-microbe interactions and microbial consortia application for enhancing sustainable agriculture: a review. Front Microbiol 11:560406. 10.3389/fmicb.2020.560406. PubMed.
5. Majeed A, Kaleem A M, Hameed S, Imran A, Rahim N. 2015. Isolation and characterization of plant growth-promoting rhizobacteria from wheat rhizosphere and their effect on plant growth promotion. Front Microbiol 6:198. 10.3389/fmicb.2015.00198. PubMed.
6. Albdaiwi R N, Khyami-Horani H, Ayad J Y, Alananbeh K M, Al-Sayaydeh R. 2019. Isolation and characterization of halotolerant plant growth promoting rhizobacteria from durum wheat (Triticum turgidum subsp. durum) cultivated in saline areas of the dead sea region. Front Microbiol 10:1639. 10.3389/fmicb.2019.01639. PubMed.
7. Di Benedetto N A, Campaniello D, Bevilacqua A, Cataldi M P, Sinigaglia M, Flagella Z, Corbo M R. 2019. Isolation, screening, and characterization of plant-growth-promoting bacteria from durum wheat rhizosphere to improve N and P nutrient use efficiency. Microorganisms 7:541. 10.3390/microorganisms7110541.
8. Rilling J I, Acuña JJ, Sadowsky M J, Jorquera M A. 2018. Putative nitrogen-fixing bacteria associated with the rhizosphere and root endosphere of wheat plants grown in an andisol from southern Chile. Front Microbiol 9:2710. 10.3389/fmicb.2018.02710. PubMed.
9. Martinez-Hidalgo P, Maymon M, Pule-Meulenberg F, Hirsch A M. 2019. Engineering root microbiomes for healthier crops and soils using beneficial, environmentally safe bacteria. Can J Microbiol 65:91-104. 10.1139/cjm-2018-0315. PubMed.
10. Bodor A, Bounedjoum N, Vincze G E, Erdeiné Kis Á, Laczi K, Bende G, Szilágyi Á, Kovács T, Perei K, Rákhely G. 2020. Challenges of unculturable bacteria: environmental perspectives. Rev Environ Sci Biotechnol 19:1-22. 10.1007/s11157-020-09522-4.
11. Steen A D, Crits-Christoph A, Carini P, De Angelis K M, Fierer N, Lloyd K G, Cameron Thrash J. 2019. High proportions of bacteria and archaea across most biomes remain uncultured. ISME J 13:3126-3130. 10.1038/s41396-019-0484-y. PubMed.
12. Staley J T, Konopka A. 1985. Measurement of in situ activities of nonphotosynthetic microorganisms in aquatic and terrestrial habitats. Annu Rev Microbiol 39:321-346. 10.1146/annurev.mi.39.100185.001541. PubMed.
13. Garza D R, Dutilh B E. 2015. From cultured to uncultured genome sequences: metagenomics and modeling microbial ecosystems. Cell Mol Life Sci 72:4287-4308. 10.1007/s00018-015-2004-1. PubMed.
14. Awasthi M K, Ravindran B, Sarsaiya S, Chen H, Wainaina S, Singh E, Liu T, Kumar S, Pandey A, Singh L, Zhang Z. 2020. Metagenomics for taxonomy profiling: tools and approaches. Bioengineered 11:356-374. 10.1080/21655979.2020.1736238. PubMed.
15. Chaudhary D K, Khulan A, Kim J. 2019. Development of a novel cultivation technique for uncultured soil bacteria. Sci Rep 9:6666. 10.1038/s41598-019-43182-x. PubMed.
16. Acuña JJ, Marileo L G, Araya M A, Rilling J I, Larama G A, Mora M L, Epstein S, Jorquera M A. 2020. In situ cultivation approach to increase the culturable bacterial diversity in the rhizobiome of plants. J Soil Sci Plant Nutr 20:1411-1426. 10.1007/s42729-020-00222-0.
17. Kato S, Yamagishi A, Daimon S, Kawasaki K, Tamaki H, Kitagawa W, Abe A, Tanaka M, Sone T, Asano K, Kamagata Y. 2018. Isolation of previously uncultured slow-growing bacteria by using a simple modification in the preparation of agar media. Appl Environ Microbiol 84:e00807-18. 10.1128/AEM.00807-18. PubMed.
18. Rygaard A M, Thøgersen MS, Nielsen K F, Gram L, Bentzon-Tilia M. 2017. Effects of gelling agent and extracellular signaling molecules on the culturability of marine bacteria. Appl Environ Microbiol 83:e00243-17. 10.1128/AEM.00243-17. PubMed.
19. Pham V H T, Kim J. 2012. Cultivation of unculturable soil bacteria. Trends Biotechnol 30:475-484. 10.1016/j.tibtech.2012.05.007. PubMed.
20. Tanaka T, Kawasaki K, Daimon S, Kitagawa W, Yamamoto K, Tamaki H, Tanaka M, Nakatsu C H, Kamagata Y. 2014. A hidden pitfall in the preparation of agar media undermines microorganism cultivability. Appl Environ Microbiol 80:7659-7666. 10.1128/AEM.02741-14. PubMed.
21. Kato S, Terashima M, Yama A, Sato M, Kitagawa W, Kawasaki K, Kamagata Y. 2020. Improved isolation of uncultured anaerobic bacteria using medium prepared with separate sterilization of agar and phosphate. Microbes Environ 35:ME19060. 10.1264/jsme2.ME19060.
22. Adam D, Maciejewska M, Naômé A, Martinet L, Coppieters W, Karim L, Baurain D, Rigali S. 2018. Isolation, characterization, and antibacterial activity of hard-to-culture actinobacteria from cave moonmilk deposits. Antibiotics 7:28. 10.3390/antibiotics7020028.

23. Sakai M, Hosoda A, Ogura K, Ikenaga M. 2014. The growth of *Steroidobacter agariperforans* sp. *nov.*, a novel agar-degrading bacterium isolated from soil, is enhanced by the diffusible metabolites produced by bacteria belonging to Rhizobiales. Microbes Environ 29:89-95. 10.1264/jsme2.me13169. PubMed.

24. Das N, Tripathi N, Basu S, Bose C, Maitra S, Khurana S. 2015. Progress in the development of gelling agents for improved culturability of microorganisms. Front Microbiol 6:698. 10.3389/fmicb.2015.00698. PubMed.

25. Prajapati V D, Jani G K, Zala B S, Khutliwala T A. 2013. An insight into the emerging exopolysaccharide gellan gum as a novel polymer. Carbohydr Polym 93:670-678. 10.1016/j.carbpol.2013.01.030. PubMed.

26. Nyonyo T, Shinkai T, Tajima A, Mitsumori M. 2013. Effect of media composition, including gelling agents, on isolation of previously uncultured rumen bacteria. Lett Appl Microbiol 56:63-70. 10.1111/lam.12019. PubMed.

27. Tamaki H, Hanada S, Sekiguchi Y, Tanaka Y, Kamagata Y. 2009. Effect of gelling agent on colony formation in solid cultivation of microbial community in lake sediment. Environ Microbiol 11:1827-1834. 10.1111/j.1462-2920.2009.01907.x. PubMed.

28. Kawasaki K, Kamagata Y. 2017. Phosphate-catalyzed hydrogen peroxide formation from agar, gellan, and κ-carrageenan and recovery of microbial cultivability via catalase and pyruvate. Appl Environ Microbiol 83:e01366-17. 10.1128/AEM.01366-17. PubMed.

29. Sadovski A N. 2019. Study on pH in water and potassium chloride for Bulgarian soils. Eurasian J Soil Sci 8:11-16. 10.18393/ejss.477560.

30. FAO. 2020. FAO soils portal: management of calcareous soils. Food and Agriculture Organization of the United Nations (FAO), Rome, Italy.

31. Pikovskaya R I. 1948. Mobilization of phosphorus in soil in connection with vital activity of some microbial species. Mikrobiologiia 17:362-370.

32. Gurusinghe S, Brooks T L, Barrow R A, Zhu X, Thotagamuwa A, Dennis P G, Gupta V V, Vanniasinkam T, Weston L A. 2019. Technologies for the selection, culture and metabolic profiling of unique rhizosphere microorganisms for natural product discovery. Molecules 24:1955. 10.3390/molecules24101955.

33. Diakite A, Dubourg G, Dione N, Afouda P, Bellali S, Ngom I I, Valles C, Tall M L, Lagier J C, Raoult D. 2020. Optimization and standardization of the culturomics technique for human microbiome exploration. Sci Rep 10:9674. 10.1038/s41598-020-66738-8. PubMed.

34. Wang M, Noor S, Huan R, Liu C, Li J Y, Shi Q, Zhang Y J, Wu C, He H. 2020. Comparison of the diversity of cultured and total bacterial communities in marine sediment using culture-dependent and sequencing methods. PeerJ 8:e10060. 10.7717/peerj.10060. PubMed.

35. Janssen P H, Yates P S, Grinton B E, Taylor P M, Sait M. 2002. Improved culturability of soil bacteria and isolation in pure culture of novel members of the divisions Acidobacteria, Actinobacteria, Proteobacteria, and Verrucomicrobia. Appl Environ Microbiol 68:2391-2396. 10.1128/AEM.68.5.2391-2396.2002. PubMed.

36. Bonnet M, Lagier J C, Raoult D, Khelaifia S. 2020. Bacterial culture through selective and non-selective conditions: the evolution of culture media in clinical microbiology. New Microbes New Infect 34:100622. 10.1016/j.nmni.2019.100622. PubMed.

37. Wolinska A, Kuzniar A, Galazka A. 2020. Biodiversity in the rhizosphere of selected winter wheat (*Triticum aestivum* L.) cultivars-genetic and catabolic fingerprinting. Agronomy 10:953. 10.3390/agronomy10070953.

38. Stefani F O P, Bell T H, Marchand C, de la Providencia I E, El Yassimi A, St-Arnaud M, Hijri M. 2015. Culture-dependent and -independent methods capture different microbial community fractions in hydrocarbon-contaminated soils. PLoS One 10:e0128272. 10.1371/journal.pone.0128272. PubMed.

39. Cordero J, de Freitas J R, Germida J J. 2020. Bacterial microbiome associated with the rhizosphere and root interior of crops in Saskatchewan, Canada. Can J Microbiol 66:71-85. 10.1139/cjm-2019-0330. PubMed.

40. Latif S, Bibi S, Kouser R, Fatimah H, Farooq S, Naseer S, Kousar R. 2020. Characterization of bacterial community structure in the rhizosphere of *Triticum aestivum* L. Genomics 112:4760-4768. 10.1016/j.ygeno.2020.07.031. PubMed.

41. Kavamura V N, Robinson R J, Hughes D, Clark I, Rossmann M, de Melo I S, Hirsch P R, Mendes R, Mauchline T H. 2020. Wheat dwarfing influences selection of the rhizosphere microbiome. Sci Rep 10:1452. 10.1038/s41598-020-58402-y. PubMed.

42. Rascovan N, Carbonetto B, Perrig D, Díaz M, Canciani W, Abalo M, Alloati J, González-Anta G, Vazquez M P. 2016. Integrated analysis of root microbiomes of soybean and wheat from agricultural fields. Sci Rep 6:28084. 10.1038/srep28084. PubMed.

43. Szoboszlay M, Näther A, Liu B, Carrillo A, Castellanos T, Smalla K, Jia Z, Tebbe C C. 2019. Contrasting microbial community responses to salinization and straw amendment in a semiarid bare soil and its wheat rhizosphere. Sci Rep 9:9795. 10.1038/s41598-019-46070-6. PubMed.

44. Wang J, Li R, Zhang H, Wei G, Li Z. 2020. Beneficial bacteria activate nutrients and promote wheat growth under conditions of reduced fertilizer application. BMC Microbiol 20:38. 10.1186/s12866-020-1708-z. PubMed.

45. Sheirdil R A, Hayat R, Zhang X X, Abbasi N A, Ali S, Ahmed M, Khattak J Z K, Ahmad S. 2019. Exploring potential soil bacteria for sustainable wheat (*Triticum aestivum* L.) production. Sustainability 11:3361. 10.3390/su11123361.

46. Hussain A, Ahmad M, Nafees M, Iqbal Z, Luqman M, Jamil M, Maqsood A, Mora-Poblete F, Ahmar S, Chen J T, Alyemeni M N, Ahmad P. 2020. Plant-growth-promoting *Bacillus* and *Paenibacillus* species improve the nutritional status of *Triticum aestivum* L. PLoS One 15:e0241130. 10.1371/journal.pone.0241130. PubMed.

47. Bashan Y, Kamnev A A, de-Bashan L E. 2013. Tricalcium phosphate is inappropriate as a universal selection factor for isolating and testing phosphate-solubilizing bacteria that enhance plant growth: a proposal for an alternative procedure. Biol Fertil Soils 49:465-479. 10.1007/s00374-012-0737-7.

48. Bechtaoui N, Raklami A, Tahiri A I, Benidire L, El Alaoui A, Meddich A, Göttfert M, Oufdou K. 2019. Characterization of plant growth promoting rhizobacteria and their benefits on growth and phosphate nutrition of faba bean and wheat. Biol Open 8:bio043968. 10.1242/bio.043968. PubMed.

49. Pongsilp N, Nimnoi P. 2020. Inoculation of *Ensifer fredii* strain LP2/20 immobilized in agar results in growth promotion and alteration of bacterial community structure of Chinese kale planted soil. Sci Rep 10:15857. 10.1038/s41598-020-72986-5. PubMed.

50. Kumar S, Suyal D C, Bhoriyal M, Goel R. 2018. Plant growth promoting potential of psychrotolerant *Dyado*- bacter sp. for pulses and finger millet and impact of inoculation on soil chemical properties and diazotrophic abundance. J Plant Nutr 41:1035-1046. 10.1080/01904167.2018.1433211.
51. Page A L, Miller R H, Keeney D R. 1982. Methods of soil analysis. Part 2. Chemical and microbiological properties. American Society of Agronomy, Soil Science Society of America, Inc, Madison, WI
52. Miller J H. 1972. Experiments in molecular genetics. Cold Spring Harbor Laboratory Press, Cold Spring Harbor, NY
53. Jensen H L. 1942. Nitrogen fixation in leguminous plants. I. General characters of root-nodule bacteria isolated from species of Medicago and Trifolium in Australia, p 98-108. In Proceedings of the Linnean Society of New South Wales. Linnean Society of New South Wales, Sydney, Australia.
54. Lane D J. 1991. 16S/23S rRNA sequencing, p 115-175. In Stackebrandt E, Goodfellow M (ed), Nucleic acid techniques in bacterial systematics. John Wiley and Sons, New York, NY
55. Turner S, Pryer K M, Miao V P, Palmer J D. 1999. Investigating deep phylogenetic relationships among cyanobacteria and plastids by small subunit rRNA sequence analysis. J Eukaryot Microbiol 46:327-338. 10.1111/j.1550-7408.1999.tb04612.x. PubMed.
56. Altschul S F, Madden T L, Schäffer A A, Zhang J, Zhang Z, Miller W, Lipman D J. 1997. Gapped BLAST and PSI-BLAST: a new generation of protein database search programs. Nucleic Acids Res 25:3389-3402. 10.1093/nar/25.17.3389. PubMed.
57. Saitou N, Nei M. 1987. The neighbor-joining method: a new method for reconstructing phylogenetic trees. Mol Biol Evol 4:406-425. 10.1093/oxfordjournals.molbev.a040454. PubMed.
58. Kumar S, Stecher G, Li M, Knyaz C, Tamura K. 2018. MEGA X: Molecular Evolutionary Genetics Analysis across computing platforms. Mol Biol Evol 35:1547-1549. 10.1093/molbev/msy096. PubMed.
59. Watanabe F S, Olsen S R. 1965. Test of an ascorbic acid method for determining phosphorus in water and NaHCO3 extracts from soil. Soil Sci Soc Am J 29:677-678. 10.2136/sssaj1965.03615995002900060025x.
60. Arora N K, Verma M. 2017. Modified microplate method for rapid and efficient estimation of siderophore produced by bacteria. 3 Biotech 7:381. 10.1007/s13205-017-1008-y. PubMed.
61. Payne S M. 1994. Detection, isolation, and characterization of siderophores. Methods Enzymol 235:329-344. 10.1016/0076-6879(94)35151-1. PubMed.

The invention claimed is:

1. A composition comprising one or more microbial isolates, wherein the microbial isolates include a *Variovorax boronicumulans* EBFNA2 microbial isolate (GenBank assembly accession number GCA_033802765.1).

2. The composition of claim 1, wherein the composition comprises two or more said microbial isolates.

3. The composition of claim 1, wherein the composition comprises three or more said microbial isolates.

4. The composition of claim 1, wherein the composition comprises four or more said microbial isolates.

5. The composition of claim 1, wherein the composition comprises five or more said microbial isolates.

6. The composition of claim 1, wherein the microbial isolate has one or more of the following abilities in a plant: nitrogen fixation, siderophore production, iron chelation, phosphate solubilization, chitinase production, cellulase production, pectinase production, xylanase production, growth at pH 4.5, growth at pH 4, growth at pH 5.5, growth at pH 7, growth at pH 9, and/or growth in 5% NaCl.

7. The composition of claim 1, wherein the composition further comprises plant seeds.

8. The composition of claim 7, wherein the plant seeds are plant seeds of a dicotyledon.

9. The composition of claim 7, wherein the plant seeds are plant seeds of a crop plant.

10. The composition of claim 9, wherein the crop plant is corn.

11. The composition of claim 9, wherein the crop plant is wheat.

12. The composition of claim 9, wherein the crop plant is *sorghum*.

13. The composition of claim 7, wherein the plant seeds are plant seeds of a legume.

14. The composition of claim 13, wherein the legume is cowpea.

15. The composition of claim 1, wherein the composition further comprises one or more rhizobial bacterial strains.

\* \* \* \* \*